(12) United States Patent
Tumperi et al.

(10) Patent No.: US 7,522,060 B1
(45) Date of Patent: Apr. 21, 2009

(54) GRADUATED SANCTION/PROGRESSIVE RESPONSE SYSTEM AND METHOD FOR AUTOMATED MONITORING, SCHEDULING AND NOTIFICATION

(75) Inventors: Eric D. Tumperi, Decatur, GA (US); Charles G. Johnson, Lilburn, GA (US); Kyle E. Merrigan, Roswell, GA (US); Andrew H. Cohen, Vienna, VA (US); Dorian Cameron, Snellville, GA (US); Mary G. Gatch, Sullivans Island, SC (US)

(73) Assignee: Anytransactions, Inc., Decatur, GA (US)

( * ) Notice: Subject to any disclaimer, the term of this patent is extended or adjusted under 35 U.S.C. 154(b) by 243 days.

(21) Appl. No.: 11/380,145

(22) Filed: Apr. 25, 2006

Related U.S. Application Data

(60) Provisional application No. 60/674,719, filed on Apr. 25, 2005.

(51) Int. Cl.
*G08B 23/00* (2006.01)

(52) U.S. Cl. .................. 340/573.4; 340/5.82; 340/5.84; 713/186

(58) Field of Classification Search ................ 340/5.82, 340/5.84, 573.4, 539.13; 713/186; 704/246
See application file for complete search history.

(56) References Cited

U.S. PATENT DOCUMENTS

| | | | | |
|---|---|---|---|---|
| 4,843,377 A | * | 6/1989 | Fuller et al. | 340/573.4 |
| 6,072,396 A | * | 6/2000 | Gaukel | 340/573.4 |
| 6,405,213 B1 | * | 6/2002 | Layson et al. | 340/539.13 |
| 6,463,127 B1 | * | 10/2002 | Maier et al. | 379/38 |
| 7,278,028 B1 | * | 10/2007 | Hingoranee | 713/186 |
| 2002/0067272 A1 | * | 6/2002 | Lemelson et al. | 340/573.4 |
| 2004/0174264 A1 | * | 9/2004 | Reisman et al. | 340/573.4 |
| 2005/0285747 A1 | * | 12/2005 | Kozlay | 340/573.4 |

* cited by examiner

*Primary Examiner*—Thomas J Mullen
(74) *Attorney, Agent, or Firm*—Dana T. Hustins; Smith, Gambrell & Russell, LLP

(57) ABSTRACT

An integrated, multi-function management system and method that allows criminal justice professionals and criminal justice agencies to enhance the efficiency and quality of their operations. The method includes a unique framework of one or more agency customized protocols that guides and assists the process by which criminal justice professionals carry out their supervision responsibilities for the offender caseload. The method further includes case configuration for individual offenders, infraction handling for individual or groups of infractions, sanction/response handling using multiple factors to determine if a subject should have their case conditions change, case review information that uses business rules to draw attention to important matters, and alert/report processing that assures that the right individuals are notified of case status changes so that they can act in a timely way. Further, the method integrates a multiplicity of possible choices and factors into a prescribed protocol to increase consistency and measurability, thereby improving agency results.

20 Claims, 28 Drawing Sheets

Fig. 12 roboCUFF

| Dashboard | Instructions | FAQs | Support | Logout |

View: --select-- ▼

Program Summary — 601

Reports

| Name | Case | Customer | Officer | Protocol | Risk | Level | Duration | Days Left | Status |
|---|---|---|---|---|---|---|---|---|---|
| Sample 1 | 0603jd101 | Example Agency | Johnson | House Arrest | Medium | S2 | 21 | 8 | OK |
| Sample 2 | 0603JD109 | Example Agency | Johnson | House Arrest | Medium | S1 | 21 | 13 | OK |
| Sample 3 | 0604JD138 | Example Agency | Johnson | House Arrest | Medium | S1 | 21 | 18 | OK |
| Sample 4 | 0604JD139 | Example Agency | Johnson | House Arrest | Medium | S1 | 21 | 19 | OK |
| Sample 5 | 0602JD44 | Example Agency | Johnson | School HA | High | P1 | 16 | 6 | OK |
| Sample 6 | 0603JD108 | Example Agency | Johnson | School HA | Medium | S2 | 21 | 8 | OK |
| Sample 7 | 0604jv375 | Example Agency | Johnson | House Arrest | High | S1 | 21 | 13 | OK |
| Sample 8 | 0602JD47 | Example Agency | Johnson | House Arrest | High | S1 | 21 | 19 | OK |
| Sample 9 | 0603js27 | Example Agency | Johnson | House Arrest | High | P1 | 16 | 18 | Attention |
| Sample 10 | 0604jv355 | Example Agency | Johnson | House Arrest | High | P1 | 16 | 3 | Transition ← 602 |
| Sample 11 | 0512S119 | Example Agency | Johnson | House Arrest | High | S1 | 21 | 3 | OK |
| Sample 12 | 0604jv374 | Example Agency | Johnson | House Arrest | High | P2 | 11 | 3 | OK |
| Sample 13 | 0601JD35 | Example Agency | Johnson | House Arrest | Medium | S2 | 21 | 8 | Attention |
| Sample 14 | 0604jd125 | Example Agency | Johnson | House Arrest | Medium | P1 | 16 | 9 | OK |

Fig. 13 roboCUFF

| Dashboard | Instructions | FAQs | Support | Logout |

My Cases: --Select-- Reports --Select--

Case Summary | Case Info | Resolve check-ins | Transition | Schedule | Program Summary

Joe Sample — House Arrest S1 Medium — Days Left on Level S1 = 12

Monitor Period: 04/13/2006 - 05/12/2006

Protocol Level Description

| Criteria | Definition |
|---|---|
| Duration | 20 Days |
| Random Calls | 3 |
| Days/Month | 30 |

Weekly Schedule

Violation Definition

| Parameter | Threshold | Current |
|---|---|---|
| Missed in a row | 2 | 0 |
| Late in a row | 3 | 0 |
| Line busy | 1 | 0 |
| Missed | 3 | 0 |
| Late | 4 | 0 |
| Bad location | 1 | 0 |
| Confirmed PV | 1 | 0 |

Print Client Instructions

Transition History

| Protocol | Level | Risk | Start Date | Action |
|---|---|---|---|---|
| House Arrest | None to S1 | Medium | 04/12/2006 | Initialized |

Recent Check-in History

| Date | Time | Type | Status | Result |
|---|---|---|---|---|
| 04/20/2006 | 07:45 PM | Random | Scheduled | |
| 04/20/2006 | 05:00 PM | Random | Scheduled | |
| 04/20/2006 | 09:00 AM | Random | Successful | |
| 04/19/2006 | 07:45 PM | Random | Successful | |
| 04/19/2006 | 05:45 PM | Random | Successful | |
| 04/18/2006 | 07:00 AM | Random | Successful | |
| 04/18/2006 | 07:45 PM | Random | Successful | |

Cancel Calls     Add Call

Fig. 17 roboCUFF

Case Creation

| Dashboard | Instructions | FAQs | Support | Logout |

Create Basic Case

Biographical Information

First Name: [         ]   Last Name: [         ]

Home Phone: [         ]   DoB (mm/dd/yyyy): [         ]

Gender:  ⊙ Male  ○ Female   Ethnicity: [African-American ▼]

Case Information

Case #: [         ]   Officer: [----Select---- ▼]

Program Information

Protocol: [Juvenile Curfew ▼]   Level: [S2 ▼]   Risk: [Medium ▼]

Level S2 has the following components: Monitoring hours:9:00pm-7:00am; Random Calls: 1; Days per Month: 20; Sleep Blackout:11:30pm-7:00am; Messaging: Positive Reinforcement, Meeting Reminders; Interview: None

Monitoring Information

Monitor Start (mm/dd/yyyy): [04/20/2006]   Monitor End (mm/dd/yyyy): ○ Fixed Date [05/21/2006]  ⊙ No fixed end date.

Billing Code (optional): [         ]

[ Create Case ]  [ Cancel ]

1101

Fig. 18 roboCUFF

Customer Service Request

Use this form to change the curfew schedule or list any regularly scheduled activities where the subject leaves home. Be sure to include the start and stop dates, the days of the week and activity times and the travel time to and from the activity.

Examples:

Change Curfew Sat-Sun 9 PM – 7 AM

Work Mon-Fri 8 AM – 5 PM and
Sat 10 AM – 5 PM –
30 Min travel time

AA 10/16/05 - 11/12/05
Tue 6:30 PM – 8:00 PM
45 Min travel time

Dashboard | Instructions | FAQs | Support | Logout

Case: Williams, Scott
Reason: Schedule change

Add Preset call between 10 and 11 AM
from work: 888-555-1111

Submit    Cancel

1201

Logged Change Request/Action Taken

Daily Customer Service Calls

Ops Dashboard   Cust Summary   Logins   New Cases   New Edits   Forced Calls   Employees   Billing

| Time Submitted | Stat | Last Action | Case | Office | Customer | Reason | IN/OUT | Rep | Future Action | Request | Analysis |
|---|---|---|---|---|---|---|---|---|---|---|---|
| 2006-04-11 23:40:31.0 | C | 11-APR-06 | Williams | Support-PC | roboCUFF Training | Schedule change | IN | Support-PC | | Add preset calls between 10 and 11am from work; 888-555-1111 | |

Fig. 19

Protocol Transition

Scott Williams — Juvenile Aftercare P1 High

Recommendation: Transition from P1 to P2

Reason: Exceeded max number of missed check-ins

Infractions Since Last Transition Action

| Date | Status | Result |
|---|---|---|
| 20-APR (THU) 07:45 PM | Missed | Undecided |
| 20-APR (THU) 06:00 PM | Missed | Undecided |
| 19-APR (WED) 12:00 PM | Missed | Undecided |
| 18-APR (TUE) 12:00 PM | Missed | Undecided |
| 17-APR (MON) 12:00 PM | Missed | Undecided |
| 16-APR (SUN) 09:00 PM | Missed | Undecided |
| 15-APR (SAT) 09:30 PM | Missed | Undecided |

Transition Action

- ○ Move to Level [P2]
- ○ Reset Current Level
- ○ Restart Current Level
- ○ Change Current Risk [High]

[Submit]

Dashboard | Instructions | FAQs | Support | Logout

My Cases: --Select-- ▼   Transitions: --Select-- ▼  70 remaining

Program   Case Info   Case Summary   Resolve   Reports

[Print Client Instructions]   [Change Protocol]

Moving from Level P1 to Level P2 moves your monitoring to 24 Hrs/day and increases the intensity of monitoring.

Transition History

| Protocol | Level | Risk | Effective Date | Action |
|---|---|---|---|---|
| Juvenile Aftercare | P2 to P1 | High | 04/08/2006 | Move |
| Juvenile Aftercare | P1 to P2 | High | 04/06/2006 | Move |
| Juvenile Aftercare | S1 to P1 | High | 03/28/2006 | Move |
| Juvenile Aftercare | S2 to S1 | High | 03/15/2006 | Move |

Action Comments:

1301

Sex Offender – No TX

The Juvenile Sex Offender – No TX (not in treatment) protocol provides a range of sanctions and responses for juvenile offenders who have been assigned to a house arrest program. This program is designed to give Juvenile Officers control over their subject's schedule, while ensuring the subject is at home when they are not at school.

| Start | Step | Duration of Step | Hours of Monitoring | Random Calls | Days/Month | Boundary Calls | Preset Calls | Other |
|---|---|---|---|---|---|---|---|---|
| Low | S2 | 30 days | 4pm – 6:30am | 2 | Daily | None | None | 11:00pm – 6:30am Blackout<br>No calls on Sunday |
| Med | S1 | 30 days | 4pm – 6:30am | 4 | Daily | Between 4:00pm & 4:30pm | 1-School 7:30-8:30 am | 11:00pm – 6:30am Blackout – all 7 days |
| High | P1 | 30 days | 4:00pm– 6:30am | 5 | Daily | Between 4:00pm & 4:30pm | 2-School 7:30-8:30 am<br>12-1 pm | 11:00pm – 6:30am blackout- all 7 days<br>24 hour monitoring on weekends |
|  | P2 | 15 days | 4:00pm– 6:30am | 5 | Daily | M-F: Between 4:00pm & 4:30pm | 2-School 7:30-8:30 am<br>12-1 pm | 24 hour weekend monitoring<br>No Sleep Blackout |

| Sex Offender – No TX | | Risk Level | |
|---|---|---|---|
| Protocol Violation Definition | High | Medium | Low |
| ☑ Missed Check-ins in a row | 1 | 2 | 2 |
| ☑ Late Check-ins in a row | 1 | 3 | 3 |
| ☑ Line Busy Alerts | 1 | 3 | 4 |
| ☑ Missed Check-ins | 1 | 3 | 3 |
| ☑ Late Check-ins | 1 | 4 | 5 |
| ☑ Bad Location Check-in | 1 | 1 | 1 |
| ☑ Confirmed Failed Verify (Imposter) | 1 | 1 | 1 |

Fig. 20

Fig. 21 roboCUFF Graduated Sanctions Administration

Dashboard   Logout

- GS Admin Home
- Document Control
- Customer Select
- Program Configuration
- Protocol Configuration
- Protocol Levels
- Validate
- Publish
- Report Dashboard / Admin Home
Admin Home

Create Or Manage A GS Program

To create a new Program, select a District to work with and enter the name of the Program. You will have an opportunity to select the Customer for whom the Program will be created. You may also continue work on Programs, or perform initial or final Quality Assurance on Programs as well as make changes to existing Programs currently in production.

| District | Item Name | Action |
|---|---|---|
| --Select-- ▾ | --Select-- ▾ | Create New Work Item |
|  | --Select-- ▾ | Continue With Work Item |
|  | --Select-- ▾ | Perform Initial QA |
|  | --Select-- ▾ | Perform Final QA |
|  |  | Change Program |

1501

GRADUATED SANCTION/PROGRESSIVE RESPONSE SYSTEM AND METHOD FOR AUTOMATED MONITORING, SCHEDULING AND NOTIFICATION

CROSS-REFERENCE TO RELATED APPLICATIONS

This application claims the benefit of U.S. Provisional Application 60/674,719 filed on Apr. 25, 2005, which is incorporated herein by reference in its entirety.

BACKGROUND

The invention relates generally to the field of electronic monitoring and supervision in the criminal justice field. More specifically, embodiments of the invention relate to systems and methods for computerized management of offenders being supervised by criminal justice agencies and their staff.

As the use of probation and other community supervision programs has grown over the past twenty years (to over 6,000,000 adults and juveniles in 2005), the pressure on increasing caseloads and officer efficiency has likewise increased. Combined with the recent phenomenon of the tightening of federal, state and local tax budgets, criminal justice agencies are faced with increasing quantity and complexity of caseloads with the same or lesser budgets. There is a call for best practices, a greater use of automation, and an intelligent program design that is proven effective to solve the variety of community supervision needs.

In many countries, and particularly the United States of America, it is well known that the criminal justice system makes great use of probation, parole and pretrial release to ease overcrowding of jails, for alternative sentencing, for specialized treatment programs, and other purposes that require a human services involvement to address criminal behavior that does not or no longer requires incarceration. The courts, local, state and federal, and probation departments place individuals on special forms of community supervision that require electronic supervision—providing a measure of confidence and security that these offenders are being more closely watched and supervised than would be possible by human means alone.

The use of electronic monitoring, or electronic supervision, has been widely used in the industry for well over fifteen years. Electronic monitoring has been dominated by the use of radio frequency bracelet monitoring, and more recently global positioning satellite (GPS) monitoring—both requiring the use of wearable devices that cannot be removed from the body of the offender during their electronic supervision period. Additionally, these forms of hardware-based monitoring systems are prone to false alerts, logistical issues, break/fix issues associated with the wearable devices, and with a high total cost of ownership.

The variety of cases and offender behavior management techniques are numerous. An example of a mode of community supervision is intensive supervision. For this mode, caseloads per officer are between 15 and 30 cases, and elements include active probation officer intervention, job skills enhancement, education, electronic monitoring, drug and alcohol testing, and temporary incarceration. The officer applies any or all of these elements based on the needs of the individual case. Another example of a mode of community supervision is treatment oriented. For this mode, caseloads per officer are 20-40, and elements include active case manager intervention, treatment, therapy, drug and alcohol testing, electronic supervision and temporary incarceration. The officer applies any or all of these elements based on the needs of the individual case. Another example of a mode of community supervision is (standard) probation. For this mode, caseloads range from 30-80 for juvenile offenders and from 40-120 for adult offenders, and elements include periodic probation officer interaction, education, electronic monitoring or supervision, drug and alcohol testing, and temporary incarceration. The officer applies any or all of these elements based on the needs of the individual case. Another example of a mode of community supervision is administrative probation. For this mode, caseloads per officer can range from 150 to 300, and elements include infrequent officer contact, maintaining a record of home address, employment and other important probation conditions (such as non use of drugs, alcohol, etc.). In any court system, state or local probation system, these modes and others are customized to the local laws, the history and the culture of the judicial system, and the needs and wants of the community.

The needs of an individual case—to control their substance abuse, their behaviors that lead to criminality, their emotional instability, their cognitive skills deficits, their non-compliant behavior while on probation, and/or their likelihood or potential to reoffend are all case characteristics that require a case manager/probation officer to intelligently apply a variety of case management tools. Electronic supervision is useful alone or in conjunction with many of these case conditions.

An electronic supervision program restricts movement during certain hours of the days of the week, and the allowable locations at which an offender may be. For example, a curfew program might require an offender to be at home between 8 pm and 7 am every day. A house arrest program might require being home 7 days by 24 hours a day except for work schedule. A truancy program might require that a juvenile offender be at school every day.

When an offender is placed on electronic supervision, the compliance or non-compliance to the terms of electronic supervision vary based on history of the probation staff and court's response to non-compliance, on the experience a case has with authority figures, on the amount of positive or negative consequences for non-compliance (such as a long term jail stay, removal from a diversion program, etc.). However, since caseloads can be overwhelming for many officers, the ability to respond in a timely fashion is challenging to nearly impossible on a consistent basis. Thus the effectiveness of electronic supervision, unless closely managed with officers having small caseloads, is often called into question by criminal justice practitioners.

In recent years, the criminal justice field has developed and refined many initiatives in the field of best practices surrounding the concept generically called graduated sanctions/progressive response. In these initiatives and studies, agencies have developed protocols and program designs that use a series of tools (as mentioned herein) that aim to provide timely and measured consequences to non-compliant behavior, and in some cases to provide meaningful incentives for compliance. To date, the use of electronic supervision is considered simply as one of many tools along a wide continuum of case management choices. The deployment of any graduated sanction/progressive response system has been done via paper-based documentation, officer training, and recordkeeping information systems.

SUMMARY OF THE INVENTION

Although there are many electronic monitoring systems available to criminal justice agencies—radio frequency bracelets, GPS bracelets and other voice monitoring systems, these traditional electronic monitoring systems are limited to narrow applications for monitoring a limited set of fixed conditions in fixed locations. In contrast, the invention addresses monitoring, management and communications across a wide variety of supervision and treatment conditions in multiple locations, and is adaptable to dynamic change in those conditions, in accordance with pre-defined protocols specified by the supervising agency, in response to compliance or non-compliance of the person being supervised. The continued growth of community supervision, their respective caseload pressures, and the need to avoid complexities and unnecessary tasks or costs make it imperative that criminal justice agencies find new and novel ways to manage their cases more effectively (reducing recidivism), more efficiently (doing it in less time) and more consistently (allowing for best practices to be learned, understood and promulgated). Therefore it is useful for a criminal justice agency to have a tool for instituting, automating and managing their agency specific graduated sanctions and progressive response protocols in combination with electronic supervision and communications.

In one embodiment, the invention provides an integrated, multiple-function electronic supervision management system that allows criminal justice agencies to adopt and automate graduated sanction and progressive response protocols in order to enhance the efficiency and effectiveness of their operations.

One aspect of the present invention provides methods for managing offenders. Methods according to this aspect of the invention include selecting a customized protocol from among a group of agency specific protocols, personalizing the offender schedule, messaging parameters and other supervision conditions and treatment components, and activating the automated supervision and protocol handling system. The method further includes measuring outcomes of offender compliance and non-compliance and comparing those against protocol thresholds, communicating important case specific messages with the offender related to their observed behavior and requesting and storing offender responses as required by the protocol, providing essential and actionable alert and report information to the appropriate agency officials so that their responses to offender behavior can be timely and measured in a way that optimizes outcomes. The method further includes systematic measurements of outcomes, across multiple dimensions of case management tools, to allow for continuous improvements in agency-specific graduated sanction/progressive response protocols. The method further includes aggregation of protocol outcome data across multiple criminal justice agencies, allowing participating agencies to benefit from the experiences and improvements discovered in their peer organizations around the world.

Systems according to embodiments of the invention include a data store for storing case activated agency-specific protocols, events and messages, compliance and non-compliance data for electronic supervision and affiliated officer case management information. The data store includes information relating to operational requirements for running and managing a single system across a multitude of independent agencies, the digital imprint and audio record of every offender interaction with the voice monitoring system, closed loop recordkeeping on all offender and officer responses to all notable events (such as a missed check-in), data representations of agency-specific protocols present and past and associated case and transition histories, data representations and stored voice message fragments that are built into meaningful and timely offender messages, triggers and thresholds used by business rule engines to make real time decisions during offender check-in phone calls, during officer online sessions, and for periodic processing steps that accumulate and aggregate information across a series of single case events and/or across a universe of cases (within an agency or across agencies). The system further includes secure data communications access to authorized users whose credentials allow them access to role and agency level information, outbound and inbound telephony connections to the public telephone switched network to enable offender voice authentication and communications, subject authentication engine to perform biometric voice verification and location authentication using Automated Number Identification, and compliance control mechanisms embodied in an automated scheduling engine that interfaces case protocol settings (expectations, triggers, and responses) with the real time interactions of live offender check-in calls. The system further includes automated business rules processors that are used during live offender check-in calls to personalize the messages they receive based on their current check-in call condition (compliant or non-compliant) and for the cumulative effect of their overall protocol status, are used during sanction/response handling to determine if a subject has met a condition requiring an officer's attention or requiring an automated response and related change of monitoring conditions, and are used to determine and deliver immediate alert and summary alert information to the appropriate agency personnel. The system further includes agency customization functions, protocol customization for electronic supervision components and settings, protocol administration for controlling and managing current, past and future protocol modifications in an orderly and assured fashion, and interview/messaging customization allowing for the definition, management, and event trigger definitions for interview and messaging communications components of the voice monitoring system.

Other objects and advantages of the systems and methods will become apparent to those skilled in the art after reading the detailed description of the preferred embodiment.

BRIEF DESCRIPTION OF THE DRAWINGS

FIG. 12 is a screen display of a browser window showing an exemplary program summary display in an embodiment of the present invention.

FIG. 13 is a screen display of a browser window showing an exemplary case summary display in an embodiment of the present invention.

Figure 16:
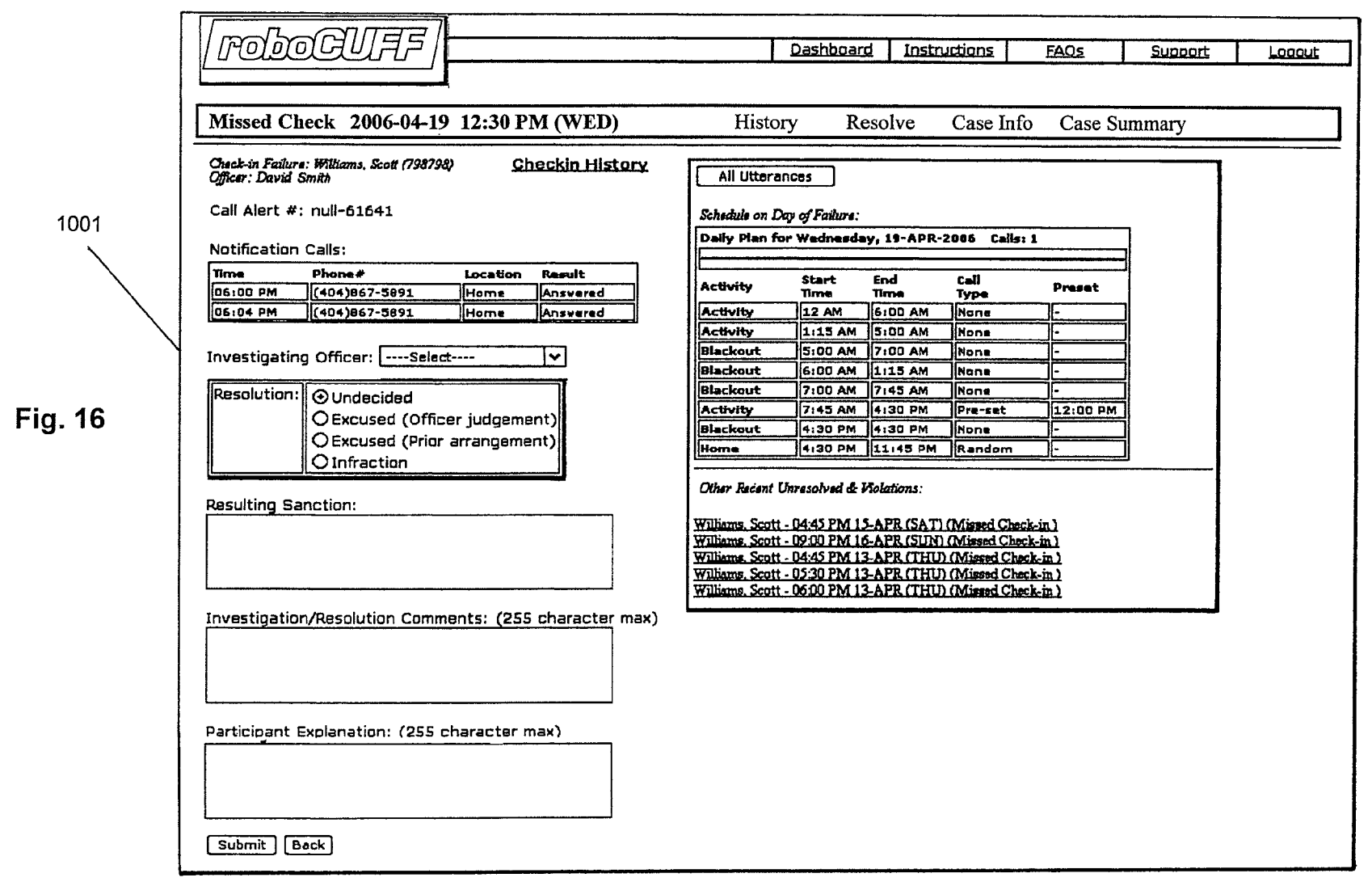

FIG. 16 is a screen display of a browser window showing an exemplary closed loop infraction report display in an embodiment of the present invention.

FIG. 17 is a screen display of a browser window showing an exemplary case configuration display in an embodiment of the present invention.

FIG. 18 is a screen display of a browser window showing an exemplary schedule change request and change history display in an embodiment of the present invention.

FIG. 19 is a browser window showing an exemplary protocol transition display in an embodiment of the present invention.

FIG. 20 is a sample control document of an exemplary protocol customization in an embodiment of the present invention.

FIG. 21 is a screen display of a browser window showing an exemplary protocol administration display in an embodiment of the present invention.

DETAILED DESCRIPTION OF THE INVENTION

Figure 1:
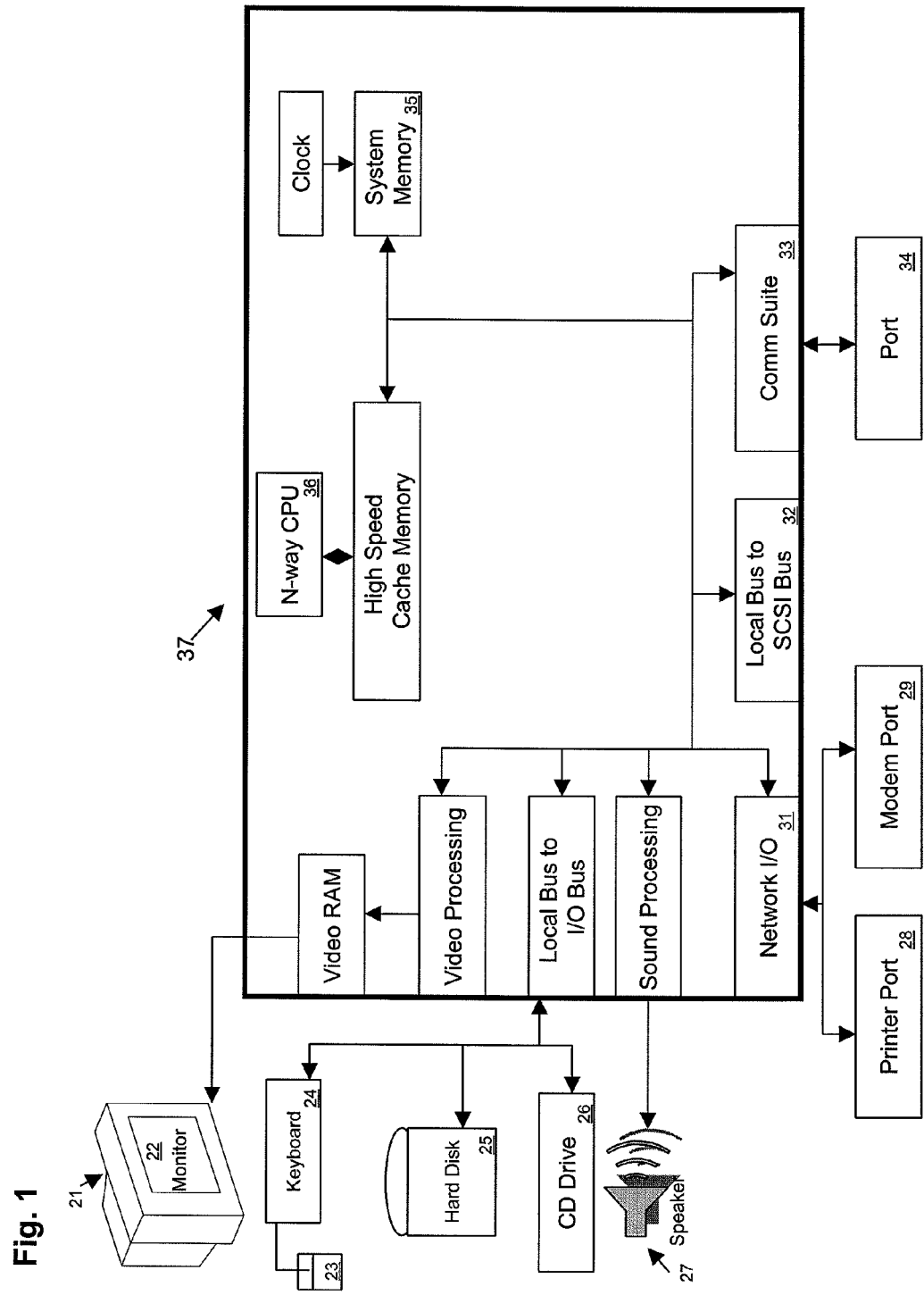
FIG. 1 is a block diagram of an exemplary computer in an embodiment of the present invention.

Embodiments of the invention will be described with reference to the accompanying drawings and figures wherein like numbers represent like elements throughout. The invention is illustrated for the criminal justice profession in handling and managing the peculiarities of their caseloads (probation offenders, pretrial defendants, etc.). However, the invention is not limited by this example and can be applied to other applications requiring interaction and communications between government contacts (whether they be government employees, government contractors or volunteers performing services on behalf of a government entity) and their respective caseloads such as state and local departments of children and family services, federal, state and local health, welfare and human services agencies who interact and communicate with clients regarding a wide variety of assessments, needs, services and programs. Further, it is to be understood that the phraseology and terminology used herein is for the purpose of description and should not be regarded as limiting. The use of "including", "comprising", or "having" and variations thereof herein is meant to encompass the items listed thereafter and equivalents thereof as well as additional items. The terms "mounted", "connected", and "coupled" are used broadly and encompass both direct and indirect mounting, connecting and coupling. Further, "connected" and "coupled" are not restricted to physical or mechanical connections or couplings. It will also be appreciated that the lettered designations represent connection reference points common to the subject letter within and across figures In one embodiment, the invention provides an online service that provides functions including customization of workflow for electronic supervision of and management for a plurality of offender case classifications so that greater effectiveness and greater efficiencies can be achieved. These functions include compliance control via randomization of check-ins and location management; random outbound notifications and inbound check-in call processing; subject voice authentication processing with specialized use of alternate speech models and statistical comparisons to achieve higher rates of accuracy; subject communications delivery of messages including positive reinforcement, negative reinforcement, meeting reminders, drug test notifications, or payment reminders, as well structured phone-based interview question and answer interactions or single requests for additional information; case configuration allowing for selection of protocols, related classification choices and the flexibility to allow for case personalization; infraction handling to allow for closed loop documentation; case review processing via online tools that highlight important exceptions, complete case files or individual events as needed; alert processing for immediate, summary and consolidated alert information; automated sanction/response handling for measuring and comparing outcomes; automated alert/report processor for sanction/response events to ensure appropriate officials are notified of time critical events; sanction/response handling for officers to enable and make decisions in the context of chosen protocols in response to measured outcomes; agency customization for establishing an agency-specific operational framework for monitoring, messaging and case management protocols; officer profile management for officer communications standards and alert profile mechanisms; protocol customization for the definition of monitoring, messaging and case management and for protocol threshold definition; protocol administration for managing operational components that provide real-time support to other system components, and provide recordkeeping and audit trails; interview/messaging customization for creating, modifying and managing agency-specific question/answer sets, and standard message modules and for settings that support business rules.

Embodiments of the invention provide online access to an application via the Internet allowing criminal justice agencies to implement a graduated sanction/progressive response system that incorporates and integrates monitoring, messaging and case management. The framework of the application allows an agency to customize the standard workflows by which they monitor, message and manage a case, as well as allow an agency to personalize any case as required. The functionality of the application provides the agency personnel with a personalized home page (dashboard) providing them a role-based view of the information in the system that displays the following: a set of one-button links to important actions or summary information such as case set-up, all active/historical cases for the entire agency, individual case check-in history, schedule summary, court report (accumulation of infractions), deactivate/reactivate a case, add/cancel calls, and daily call report. Furthermore, the functionality available from the dashboard also includes critical information and easy links to act upon that information, such as: program summary of all active cases, transition recommendation count, a listing of all cases with unresolved failed check-ins, and a listing of all cases pending voice enrollment, and all cases about to expire or recently expired. Furthermore, the functionality of the dashboard provides simple access to mechanisms related to making schedule changes via the schedule change request function. Files maintained for each case include their assigned protocol(s), their assigned risk level(s), the record of all successful outcomes and violations, a record of all transition actions taken by an officer, detailed check-in history, a record of the date, time and location (phone number) of each notification call, check-in call, and unexpected call, and a catalog of every audio file sample taken during voice authentication processing and all messages captured from the offender during their interaction phone sessions with the voice monitoring system. Files maintained for each authorized user include their associated cases, their history of log-ins including which web pages they visited (and when), what case changes they made (and when), their alert/report mechanism profile(s), their history of received protocol transition recommendations and related decisions and case notes. Files maintained for each agency include the aggregation of all data about their cases and officers, agency specific protocols for monitoring, messaging and case management with associated control documents and control dates for maintaining an audit trail, agency specific customizations of messages and interview question/answer sets, their pricing structure in support of the integrated billing and payment system, and their affiliation with a larger district/state organization or their affiliation with a third party service provider (enabling the third party service provider to have master access to their respective agencies' operational data. Reports are provided online as well by automated, scheduled generation and sent by email communications. The invention provides notification when any items of interest require attention (as determined by protocol, subject risk level, and officer alert mechanism) as well as supervisor follow-up for items that are deemed important to the successful operation of the voice monitoring, messaging and government contacts (whether they be government employees, government contractors or volunteers performing services on behalf of a government entity) management system.

In one embodiment, the invention is deployed as a web-enabled framework and is accessed through a GUI (Graphical User Interface). The application code resides on one or more centralized servers accessible through the Internet. Users access the framework by accessing the GUI via a web-enabled browser such as Microsoft IE (Internet Explorer) or others over the Internet using Internet standards and scripting languages including HTML (Hypertext Markup Language), DHTML (Dynamic HTML), Javascript, and Java. A user contacts the web server hosting the application and requests information or resources. The web server locates, and then sends the information to the web browser, which displays the results.

An embodiment of a computer 37, executing the instructions of one embodiment of the invention is shown in FIG. 1. A representative hardware environment is depicted which illustrates a typical hardware configuration of a computer. Each computer 37 includes a CPU 36, memory 35, a local data transfer bus 32, a communication suite 33 with external ports 34, 37, a network interface and protocol suite 31, hard disk drive 25, speaker(s) 27, printer port 28, optional CD drive 26, and GUI 21 includes a graphics display such as a CRT, fixed-pixel display or others (e.g. monitor) 22, a keyboard 24, pointing device 23 such as a mouse to provide an easy-to-use, user interface for the invention. The communication suite 33 and external modem ports 34 allow bi-directional communication between the computer 37, other computers 37, and external compatible devices using communication protocols such as IEEE 802.3 (Ethernet), RS (Recommended Standard) 232, 422, USB (Universal Serial Bus) and others. The network protocol suite 31 and external ports 29 allow for the physical network connection and collection of protocols when communicating over a network. Protocols such as TCP/IP (Transmission Control Protocol/Internet Protocol) suite, IPX/SPX (Internetwork Packet eXchange/Sequential Packet exchange), SNA (Systems Network Architecture), and others. The TCP/IP suite includes IP (Internet Protocol), TCP (Transmission Control Protocol), ARP (Address Resolution Protocol), and HTTP (Hypertext Transfer Protocol). Each protocol within a network protocol suite has a specific function to support communication between computers on a network. The GUI 21 includes a graphics display such as a CRT, fixed pixel display or others, a key pad, keyboard or touchscreen 24 and pointing device 23 such as a mouse, trackball, optical pen, or others to provide an easy to use, user interface for the invention. The computer 37 can be a handheld device such as an Internet appliance, PDA (Personal Digital Assistant), Blackberry device or conventional personal computer such as a PC, Macintosh, or UNIX based workstation running their appropriate operating system capable of communicating with a computer over guided or unguided media. The CPU 36 executes compatible instructions or software stored in the memory 35. Those skilled in the art will appreciate that the invention may also be practiced on platforms and operating systems other than those mentioned.

The invention is executed preferably on a server in an Internet environment or using a network. Networks allow more than one user to work together and share resources with one another. Aside from distributing processing, a network provides centralized storage capability, security and access to resources.

Network architectures vary for LANs (Local Area Networks), WANs (Wide Area Networks), and networks that use terminals to connect to mainframes. Some examples of LAN network architectures include Ethernet, token ring, FDDI (Fiber Distributed Data Interface) and ATM (Asynchronous Transfer Mode). The capability of individual computers 37 being linked together as a network is familiar to one skilled in the art.

Figure 2:
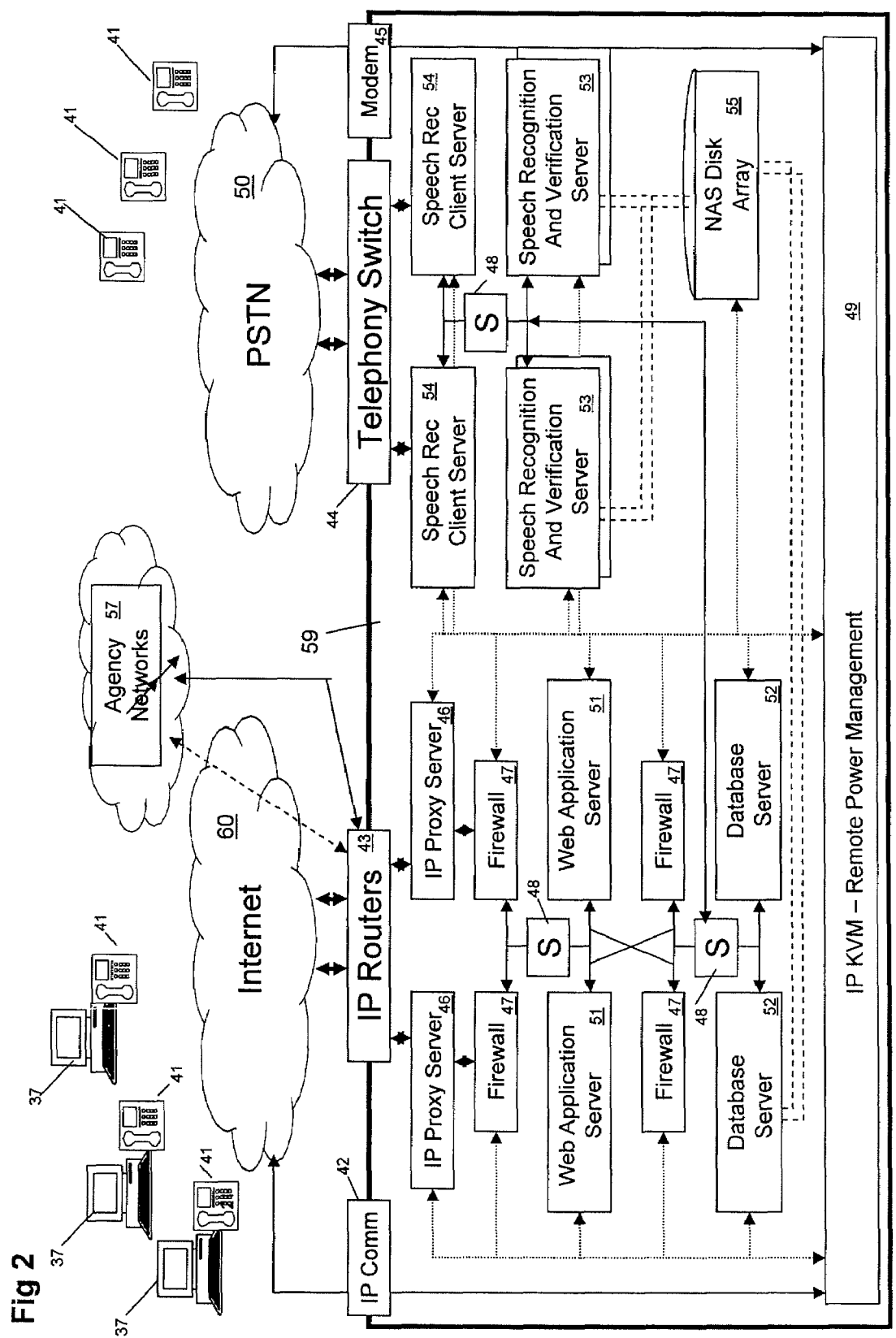
FIG. 2 is a block diagram of an exemplary computer network in an embodiment of the present invention.

In one embodiment, as shown in FIG. 2, a subject communicates with the system via a telephone 41. A telephone is an instrument that converts voice and other sound signals into a form that can be transmitted to/from a remote location; these include fixed, mobile and IP phones 41. The subject calls into the system by dialing a phone number (typically toll free). The signals are transferred to the system via the telephony network. The PSTN 50 (public switched telephone network) is the world's collection of interconnected voice-oriented, circuit-switching, public telephone networks—both commercial and government-owned. The call is delivered to the system via the PSTN system, and ISDN (Integrated Services Digital Network) voice T1 (also known as Digital Signaling) line. The voice T1 line originates in the telephone exchange, or central office, telephony switch—4/5ESS 44 (Electronic Switching System). The voice T1 line is terminated in the speech recognition client server 54. Signaling on the line provides ANI (Automatic Number Identification) that identifies the phone number of the telephone that originated the call. The signaling also provides information digits, also known as OLI (Originating Line Identifier) information. This information can indicate the types of devices that originated the call.

An example network 59 executing the invention framework is shown in FIG. 2. In one embodiment, the invention resides in a data center on four primary servers 51, 52, 53, and 55. Server 51 is an Oracle application server running on the Linux operating system, database server 52 an Oracle database server running on the Linux operating system, server 53 is a Nuance speech server running on Microsoft Win2000 Server, and server 55 is a NAS (Network Area Storage) System. When a subject calls into the system, from a telephone 41, the call is connected to the speech recognition client server 54 via the PSTN 50 and the telephony switch 44. All communications to and from any component in the network 59 to another pass through a cross connected high speed switch 48. The information provided through the voice T1 signaling provides location and device origination information to the application running on the speech fee recognition client server 54. The voice verification engine, running on the speech recognition and verification server 53, verifies the authenticity of the user from information stored in the voiceprint database 75 shown in FIG. 3. The voice recognition application 68, running on the speech fee recognition client server 54, uses information stored in the database 61 to interact with the user and determine the proper dialog and call flow. The voice recognition application uses the speech recognition engine on the speech server 53 to interpret and understand the user's utterances. Data for the calling session and the outcome of the session is stored in the database 61. Database data and media data from the calling session is stored in the NAS (Network Application Storage) disk array 55. When a user accesses the web application, from a computer 37, they are connected to the application server 51 through the proxy server 46 via the Internet 58. The user's requests are interpreted by the web application running on the application server 51. The web application accesses, retrieves and updates data in the database 61. The web application builds web pages and delivers (serves) them to the user, through the proxy server 46 via the Internet 58. A remote power management component, enabling turning on and turning off power to any component in the network 59, is connected to from an authorized user through IP communications 42 or via a modem 45 through the public switched telephone network 50. As one skilled in this art will recognize that other application server platforms and frameworks can be used such as Microsoft IIS, WebLogic, WebTrends, WebSphere, Jboss, and others. Also, other database server platforms can be used such as IBM DB2, Microsoft SQL Server, Informix, and others.

Dedicated and duplicated firewall hardware 47 and software are used to enforce security policies. The firewall software is configured to allow for a combination of multiple, independent "secure zones" (aka DMZs) inside the network. The firewalls are intelligent and remotely manageable. The system has the capability to activate a backup firewall 47 in the event that a primary firewall 47 fails to operate correctly. The router 43 determines the next network point to which a data packet should be forwarded enroute to its destination. And, it determines which way to send each data packet based on its current understanding of the state of the network(s). The proxy server 46 acts as an intermediary between the Application Server and the Internet. When an authorized user types in the log-in URL, the request is translated and delivered to the application server (that is behind the firewall). The application server generates the requested web pages, and the Web pages are delivered (served) to the user through the proxy server. The proxy server is running SSL (Secure Socket Layer) Security certificates; it encodes the data using 128-bit encryption. The duplicated proxy server(s) 46 are located inside of the DMZ. A secure connection is made between the Proxy Server 46 and the Application Server 51 to provide protection from the threat of Internet attacks. There is at least one backup proxy server 46 that is configured and brought on-line in the event that a primary proxy server 46 goes down.

In one embodiment of the invention, the management, messaging, reporting, and other user accessible components of the invention are deployed as a web-enabled application. The Web application 76 is written using JSP (Java Server Pages) in HTML (Hyper-Text Markup Language). The application use Java Servlets 77 to support the web application functionality. The application uses Servlets 77 and stored procedures 65 to implement business rules and functionality. The web application code operates on an Oracle Application Server running on the application server 51. The application server 51 is a hardware/software platform that delivers content/information to the end user via the Internet. The server interprets requests and constructs pages based on information in the system database (content/data repository). A user contacts the application server 51 and requests actions or activities, creates/updates data, and/or retrieves information or reports. The application server 51 executes the requested actions, gathers the result/outcome, and displays the result to the end user.

In one embodiment of the invention, all operational and historic data/information is stored and organized in a RDBMS (Relational Database Management System) SQL (Structured Query Language) server 52 and supporting storage system 55. The RDBMS is a client/server Oracle database running on Linux operating systems. The database server 52 processes requests from the application server 51 and speech server 53, implements the requests, and sends the results back to the requesting server. Stored procedure modules 65, to implement the system business rules, run within the database 61. All operation, historical and media data is physically stored in a central NAS Server 55. The storage server 55 can share date between the database server 52, application server 51 and the speech server 53. The server 55 replicates database data locally within the array and backs up database data to a disaster recovery site. The storage server 55 has redundant hardware and disk arrays to insure high availability of data, allowing for online replacement of any component in the disk array, including the upgrading of the CPUs themselves.

The Speech Servers 53 and 54 are configured in an N+1 configuration, each containing speech recognition and verification software, and various APIs to support speech application 68 programming. Incoming/outgoing phone calls are handled by the Recognition Client Servers 54 that run a Dialogic speech processing adapter. The initiation, call/dialog flow, and outcome of the telephony sessions, are controlled by the voice monitoring application. The speech application software 68 executes call/dialog flow based on the command/control/status information retrieved from the database. The telephony (voice T1) lines are delivered via 4ESS/5ESS telephony switches. The lines are terminated directly into Intel Dialogic equipment (boards) that are housed in the Speech Recognition Client Server 54 or via telephony switches 44 that are connected via a data interface adapter to the Recognition Client Server 54. In the event of a failure of an active speech server 53 or 54 respectively, a backup speech server 53 or 54 is activated to take responsibility for that associated workload.

The network 59 executing the invention framework is shown in FIG. 2 includes an N+1 back-up server configuration for Application Servers 51, Database Server 52, Speech Server 53 and Speech Recognition Client Server 54. At least one of the application servers 51 is designated as a backup server, and is (are) on standby at all times. The backup application server(s) 51 can be activated in the event of a failure of one of the primary application servers 51. At least one of the speech servers 53 is designated as the backup speech server (s), and is (are) on standby at all times. The backup speech server(s) 51 can be activated in the event of a failure of one of the primary speech servers. At least one identical Database Server 52, being updated via replication files throughout the day, is on standby at all times for availability purposes. A separate data replication stream is sent to a disaster recovery back-up site. Those skilled in the art will appreciate that the invention may also be practiced on platforms and operating systems other than those that have been mentioned.

The web application 76 is built using web-based technology and is available everywhere to authorized users that are connected to the Internet 60 from computers 37 via web browsers 38 such as Internet Explorer or Mozilla FireFox. Individual computers 37, at a plurality of locations, can communicate with the web applications server 51, via the proxy server 46, which in turn communicates with the database server 52. In this manner a communication path is established between the browser running on a computer 37 and the application server 51 and the database server 52.

Figure 3:
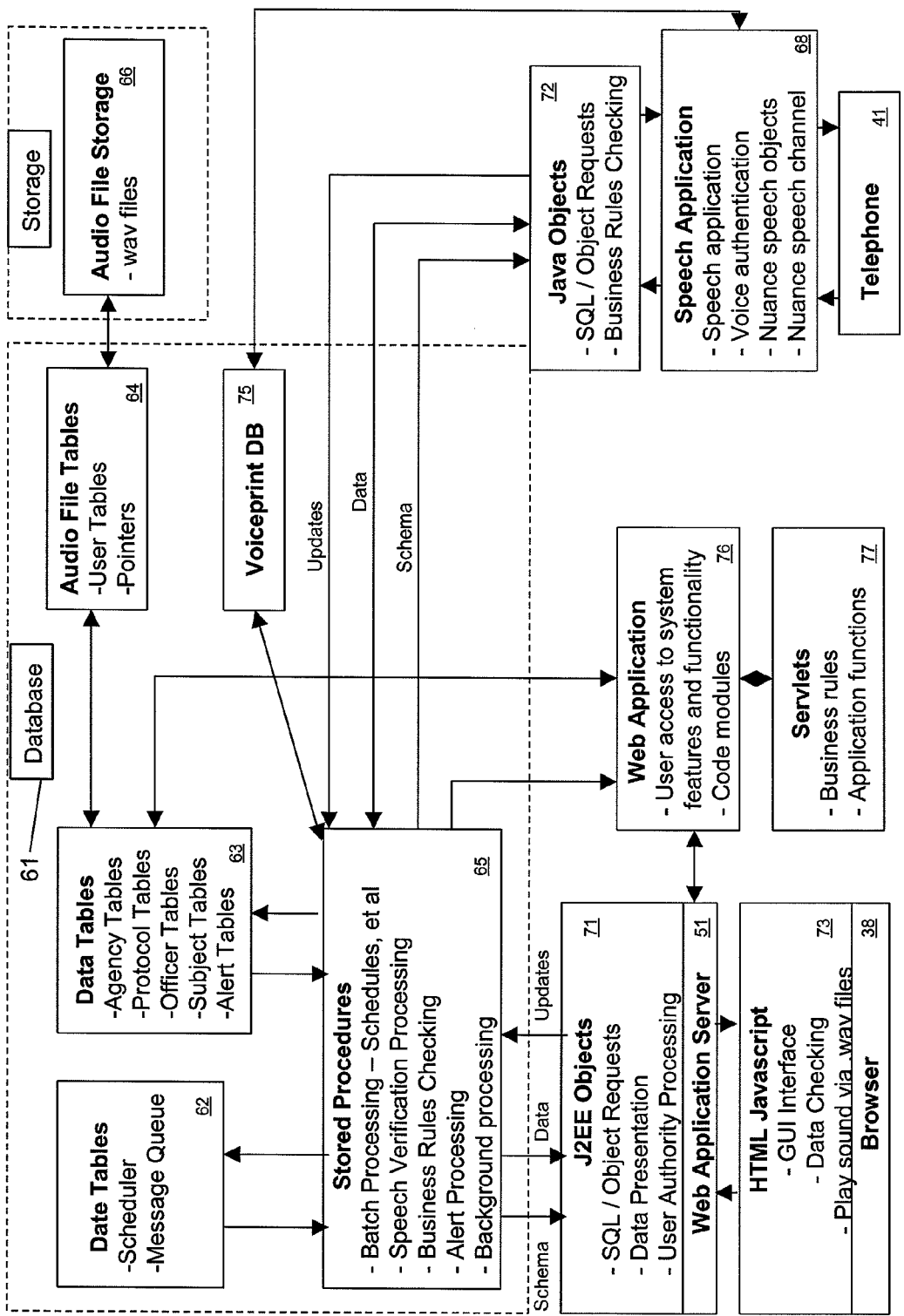
FIG. 3 is a block relational diagram an exemplary application architecture in an embodiment of the present invention.
Figure 4:
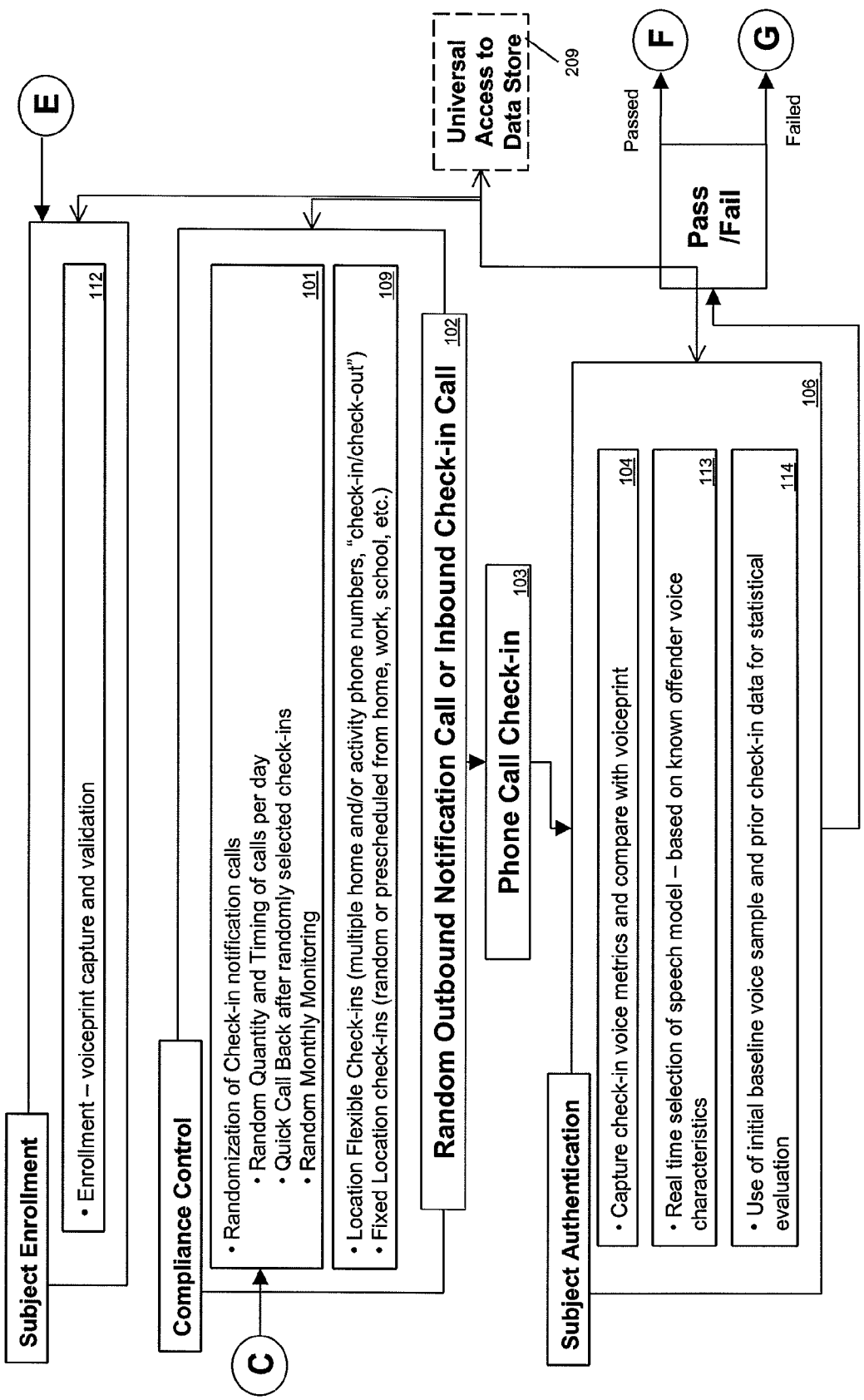
FIG. 4 is a block relational diagram of an exemplary framework of the individual offender enrollment, compliance and authentication modules in an embodiment of the present invention.

Further referencing FIGS. 3 and 4, and with continuing to reference FIG. 2, in one embodiment, the database stores all current and historical data and information for the system 63 (e.g. agency data, protocol data & definitions, case data, monitoring info, employee/officer information, subject data & information, alert info, messaging and interview data). The database 61 stores all configurations, operational and outcome data & information for system applications and processes (e.g. Web interface, protocols, monitoring, speech, messaging and interview). The database contains the call schedule tables and the messaging and interview queues 62. The stored procedures 65 contain the methods and mechanisms to implement system processes and business rules. The stored procedures 65 implement: interfacing to the web application 76 to support user interface features and functions, execution and implementation of billing modules, the building and execution of daily and monthly call schedules, building and execution of messaging and interviews, implementation of check-in sequencing, support of outbound calling/notification, support and interaction for subject check-ins, support of voice enrollment and verification, support for application logging, evaluation of check-in data and information, reporting of check-in, messaging & interview results, alerting and reporting/notification of check-in exceptions, implementation and execution of graduated sanction protocols, notification of graduated sanction outcomes and recommendations. The voiceprint database 75 stores the biometric parameters that define a subjects voiceprint. The voiceprints are accessed by the speech application 68 to authenticate a subject when they check into the system. The audio file tables 64 store audio recording data that is captured during check-in, messaging and interview sessions. The audio file storage 66 stores the audio utterances that are captured during the check-in authentication process 106. The audio files are physically stored on the storage system 55.

The user interacts with the system via the Web browser 38. The Web pages, running on the browser 38, use HTML (Hyper Text Markup Language) and Javascript 73 to display the pages, obtain information and commands from the user, and perform data checking. The user's Web browser connects to the application server instance 51 via the Internet 60. The application server 51 implements a secure login to the system using the authentication processes that are supported by the J2EE objects 71. The application server functionality is implemented and supported by J2EE (infrastructure) objects 71. The web application's 76 features and functionality are implemented by Web page functionality (code modules), J2EE objects 71, servlets 77, and stored procedures 65. The Web application 76, running on the application server 51, and supported by the J2EE objects 71, builds the requested Web pages (populated with the appropriate data). The requested Web pages are delivered to the user by the application server 51. The Web application 76 also interacts directly with the database 61 to access/update data as necessary. The Web interface allows the user to access and utilize all features and functionality that their role allows them (e.g. overall system state and status, case setup and configuration, case editing, case review, alert/infraction reporting and handling, protocol configuration and status, protocol transitions, sanction response and handling, message creation and scheduling, interview creation and scheduling, status and reporting, failed check handling and resolution, and billing system).

Computerized contacts with the subject can include all subject to system interactions requiring a biometric measurement, such as voiceprint authentication via a communications device, finger print authentication via scanners and sensors, facial and/or body recognition via remote camera, iris scan via remote scanner, DNA authentication via remote DNA sensors or any form of implanted device that determines the authenticity of a subject being involved in an interaction. Those skilled in the art will appreciate that the invention may also be practiced on any of these forms of remote biometric authentication mechanisms. In further embodiments, in addition or as an alternative to biometric identifications, verification during computerized contacts can include other personal identification mechanisms including the use of passwords, codes, passkeys, physical identification devices (including implanted technologies) and the like.

The subject typically interacts with the system via a telephone 41. The user calls into the speech application 68. The call is connected to the speech recognition server client 54 via the PSTN (Public Switched Telephone Network) 50 and the Telephony Switch 44. The call is connected to the speech application 68 via the Nuance speech channel. The speech application 68 is implemented by the speech application modules supported by the Nuance speech objects 68, the Nuance speech channel, and the Java objects 72. The user is authenticated by the voice authentication application 68 running on the speech recognition server client 54 and the verification server 53. The user interacts with one or more speech application 68 modules (e.g. enrollment, authentication, check-in, messaging, and interview). The user's utterances are recognized by the speech recognition engine running on the speech recognition server 53. The call/dialog flow is controlled by the speech application 68, the user's inputs and responds and interacts with stored procedures 65 running in the database 61. The speech application can record responses from the user, the utterances are stored as voice data files in the audio file tables 64 or as audio recording files in the audio file storage 66. Upon the completion of the call flow the system will hang-up the phone line and terminate the session.

In one embodiment of the invention, the randomly placed and prescheduled check-in times for the subject, are generated on a daily basis by a call scheduling module 101 as shown in FIG. 4. The call scheduling module schedules check-in notification calls during the subject's available monitoring window(s) based on a combination of: (1) the subject's schedule for the day—available monitoring times (windows), (2) a random selection pattern (using random number generation method) and (3) the number of random check-in calls for the day, and (4) the call distribution business rules (based on the times and duration of the monitoring windows). This will generate a pseudo-random random schedule, of check-in calls, in the subject's calling window (s). The call schedule is generated on a daily basis, and the random number generation method is re-seeded for each call schedule. Also, the random quantity of check-in calls 101 may be changed from one day to the next (e.g. if a monitoring call plan is set to 4 for a case, during any given 24 hour period, the subject might be scheduled to receive 3, 4, 5 or more check-in notification calls). Therefore, the call schedule that is generated will be random from one day to the next 101. In addition, based on subject risk profile, protocol chosen and agency profile settings, a subject will receive between 0 to 2, or more, additional check-in calls (on a daily basis). These quick call back check-in notification calls 101 will occur within 10-30 minutes after the successful completion of a scheduled check-in call at step 102. The system can also be configured to contact an alternate phone number 109 to allow for calling around busy signals, or to directly notify a subject via cell phone in a large household or halfway house. If the initial call(s) to the scheduled check-in phone number results in a busy signal (quantity defined as an agency variable), the system can then automatically call an alternate notification number (e.g. a cell phone or pager with the subject) to notify them that a check-in is now due at step 102. Whether a subject check-ins successful or fails to check-in after some number of notification attempts, a complete check-in record is created and saved in the data store 209 (FIG. 8).

Figure 8:
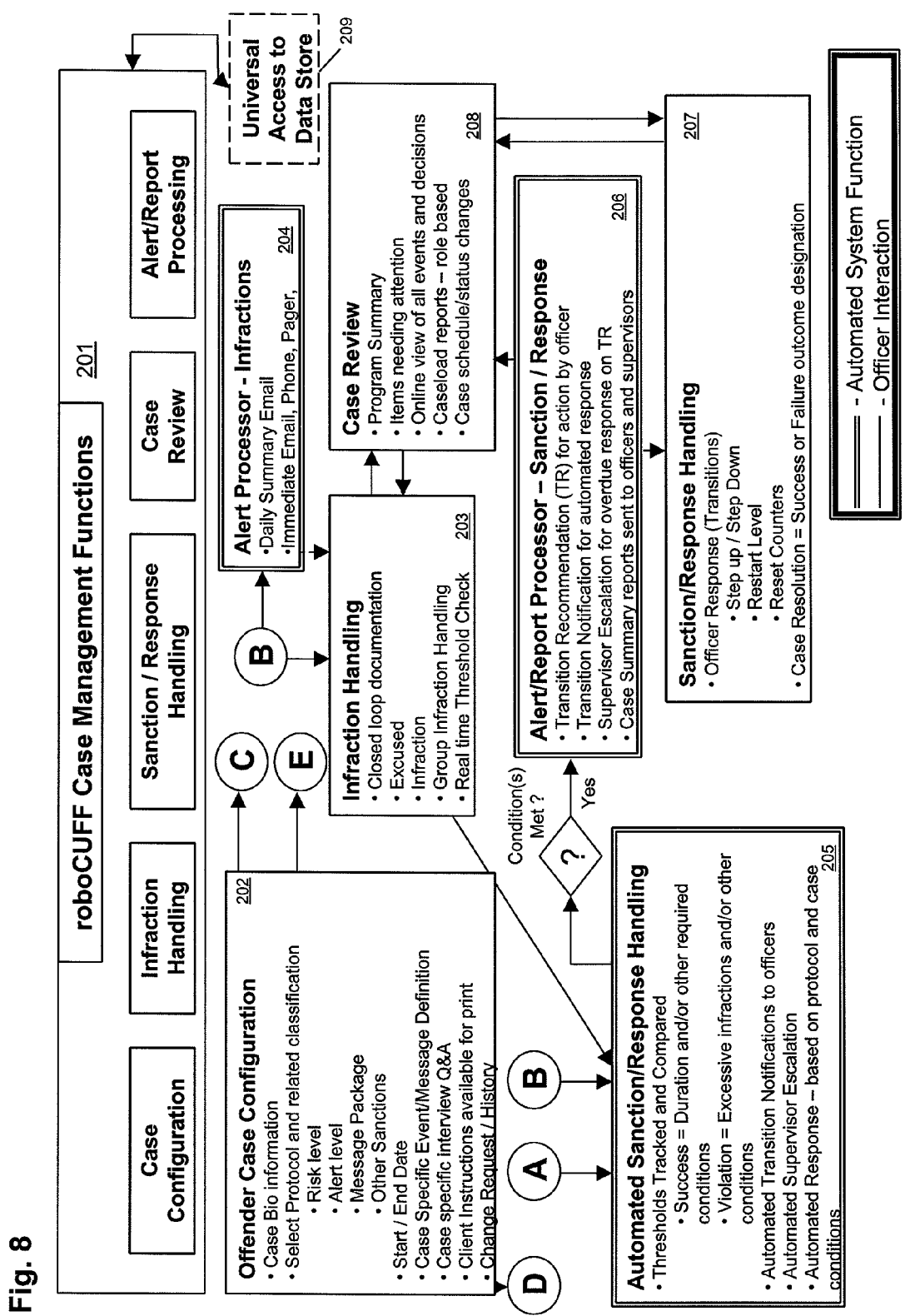
FIG. 8 is a block relational diagram an exemplary framework of the case management modules in an embodiment of the present invention.

In one embodiment of the invention, the system places notification calls at step 102 to the subject phone number based on the daily call schedule as defined in the offender bio information 202 shown in FIG. 8. The subject has a set period of time, as defined in agency customization 302 shown in FIG. 9, to respond to the notification call (usually 3-4 minutes). If the subject fails to call back and check-in, or if the phone line was busy, then the system will call again. After an agency-defined number of attempts 302 (FIG. 9) to contact the subject the system will mark the call as missed. The call schedule module also schedules pre-scheduled (inbound only) check-in calls from one or more locations based on the activity schedule for the subject 202 (FIG. 8). The activity locations can include work, school, community service and other approved locations/activities as designed by the protocol or by a customized case schedule. The system also supports the scheduling of random check-in calls at step 102 at two or more approved locations during the monitoring period. The approved check-in times and locations as defined in the offender bio information 202 have: (1) phone numbers, (2) time allowed between check-ins (specific to each location pair) and time sensitivity allowed (to accommodate differences in travel time), and (3) time(s) and day(s) during the week, when check-ins from each location are allowed. Use of subject's mobile phone number 202 as alternate check-in device is supported if the mobile device also carries location sensing information (such as global positioning satellite coordinates). If a case is allowed to be monitored on location flexible tracking 202, so that they are required to call in from one of N approved locations (again, with time/day sensitivity for each location), the system will check a subject out of one location and into another upon their check-in arrival call. Random monitoring at step 102 can then be initiated at an approved location (such as home location) once subject checks-in. This allows for subject to "relocate" to another approved location upon the check-out/check-in method, and then have the random check-in program adjust to the new location dynamically. If a subject succeeds or fails to check-in during the scheduled check-in window, a complete check-in record 111 will be created and stored in the data store 209.

With continuing reference to FIGS. 4 and 8, the system provides a randomizing mechanism 101 for a subject to be monitored for a set number of days during a month as defined in the offender case configuration 202. The mechanism will generate a random monthly calling schedule for each subject that is on a monthly calling plan. The monthly call scheduling module system will select the scheduled check-in days bases on a combination of: (1) the number of scheduled monitoring days per month, (2) the number of scheduled monitoring days for a given week in the month and (3) random selection patterns using random number generation methods. The monthly scheduler generates a call schedule on a weekly basis (for each week in the month). The number of scheduled call days for the week may be modified from one week to the next. For example, if a subject is on a ten call a month plan, then they would get either two or three calls in any given week. Also, the random number generator is re-seeded for each call schedule. This will generate a pseudo-random random monthly calling call schedule that will be random from one week to the next, and from one month to the next.

Figure 5:
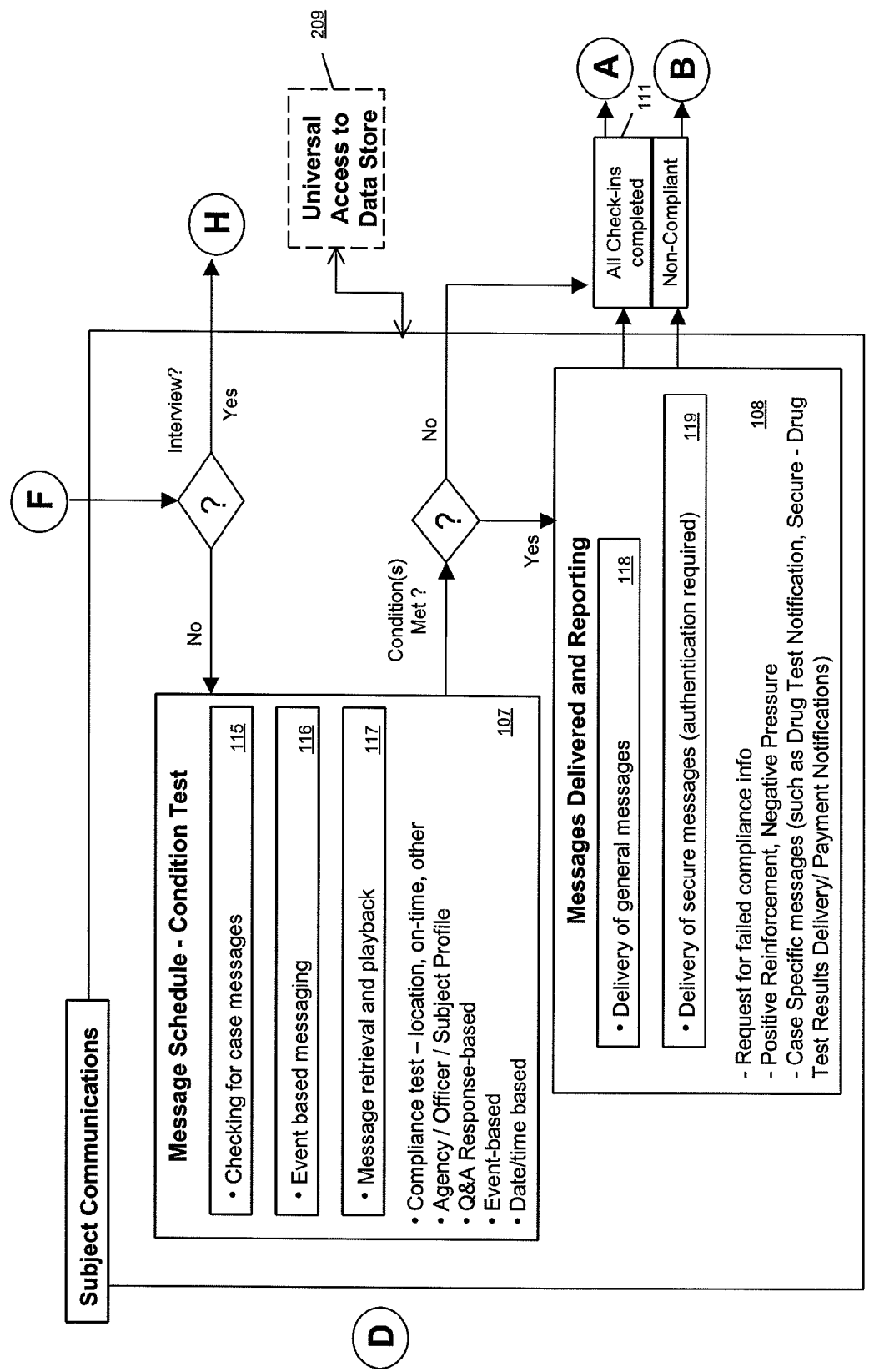
FIG. 5 is a block relational diagram of an exemplary framework of the individual offender messaging modules in an embodiment of the present invention.
Figure 6:
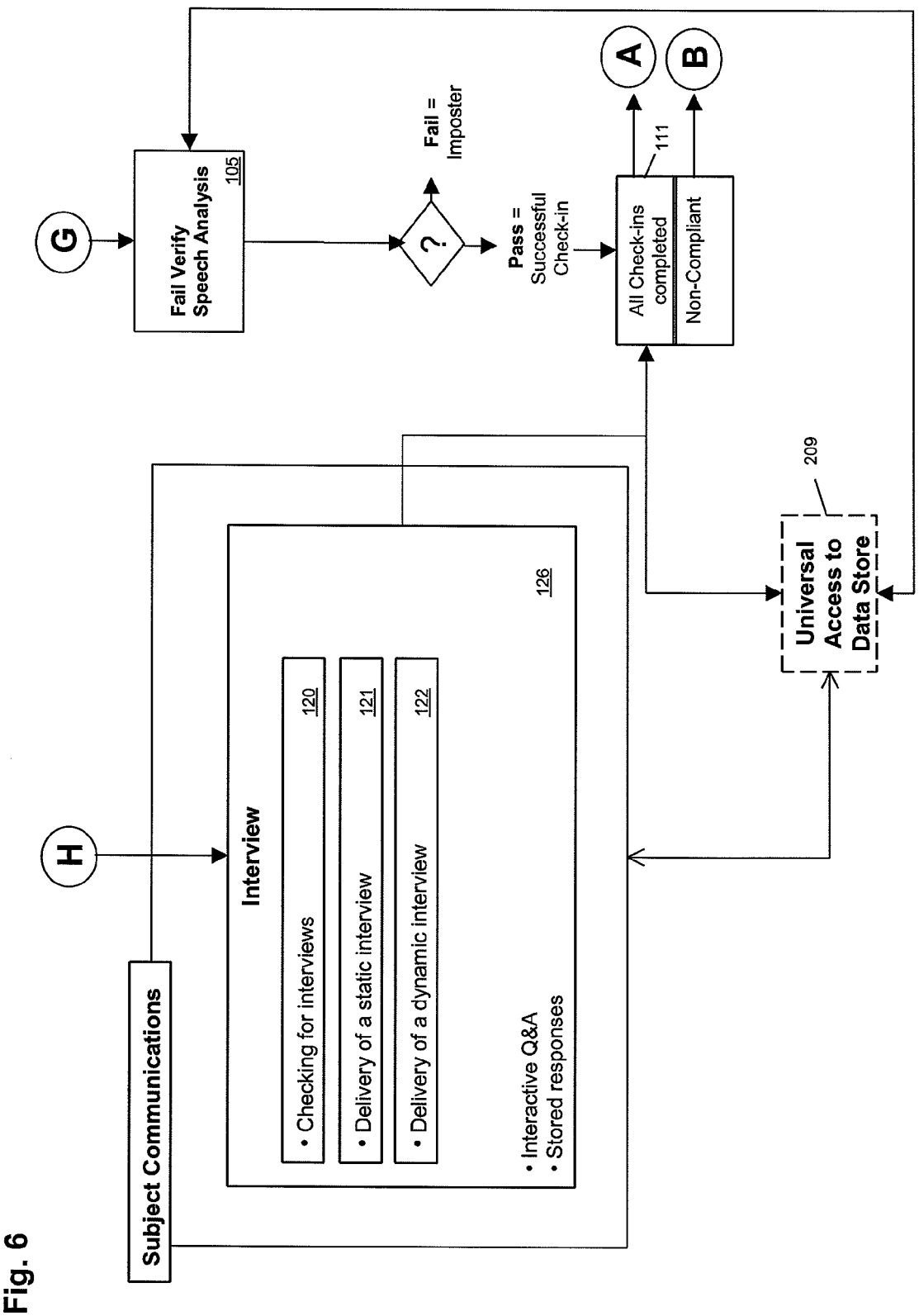
FIG. 6 is a block relational diagram of an exemplary framework of the individual offender messaging modules in an embodiment of the present invention.

With further reference to FIGS. 5 and 6 and continuing reference to FIGS. 4 and 8, in one embodiment of the invention, the subject calls into the system at step 103 in response to a notification call to the subject phone number, found in the case configuration 202 (FIG. 8), or at a pre-scheduled check-in time 202. Similarly, a subject may also engage in the check-in call upon the initial notification call. The subject's calling phone number is identified via ANI (Automatic Number Identification). At the outset of an inbound phone call, the subject is identified by the calling phone number. If more that one subject shares the same phone number, the system will use additional dialog steps to identify the proper caller. If the subject cannot be identified (as an authorized user of the system) the system asks the caller to explain why they are calling. The call results and the audio explanation are stored in the data store 209, and then the call session is terminated. If the subject is identified, then their identity is verified at step 104 using voice biometric data that is stored in the voiceprint database 75 shown in FIG. 3. If the subject does not pass voice verification a failed check-in record is generated 111, and the Fail Verify Speech Analysis process 105 is initiated as shown in FIG. 6. The system will check the daily call schedule to determine if the subject has a pending, scheduled check-in. If so, the system logs the call 209 and updates the call schedule with the results of the check-in. The check-in results include: time of call, location of call, whether the call was late or on time, verification results, audio explanations and responses from the subject, and a listing of any messages delivered and their associated responses. If a subject is late or calling from a bad location, a failed check-in record will be created. If the subject is checking in late, checking in from an unauthorized location, or fails to pass voice verification the system will request an explanation from the subject at step 115. The explanation will be recorded in an audio file and stored in the data store 209. The file name of the explanation file will be stored as part of the subject's current check-in record. If the subject has missed a previous check-in (failed to call-in/check-in within the scheduled check-in window) the system will request an explanation. The explanation will be recorded in an audio file and stored in the data store 209. The file name of the explanation file will be stored as part of the subject's corresponding missed check-in record. If the subject did not have a scheduled call, then the system asks the caller to explain why they are calling. The call results and the explanation are logged 209. The system then checks to see if the subject has any messages or any other needs to communicate with the system. If so, the system conducts the appropriate dialog with the subject 108. Upon completion of the call, the system logs all call detail in the data store 209 and terminates the check-in session.

Figure 22:
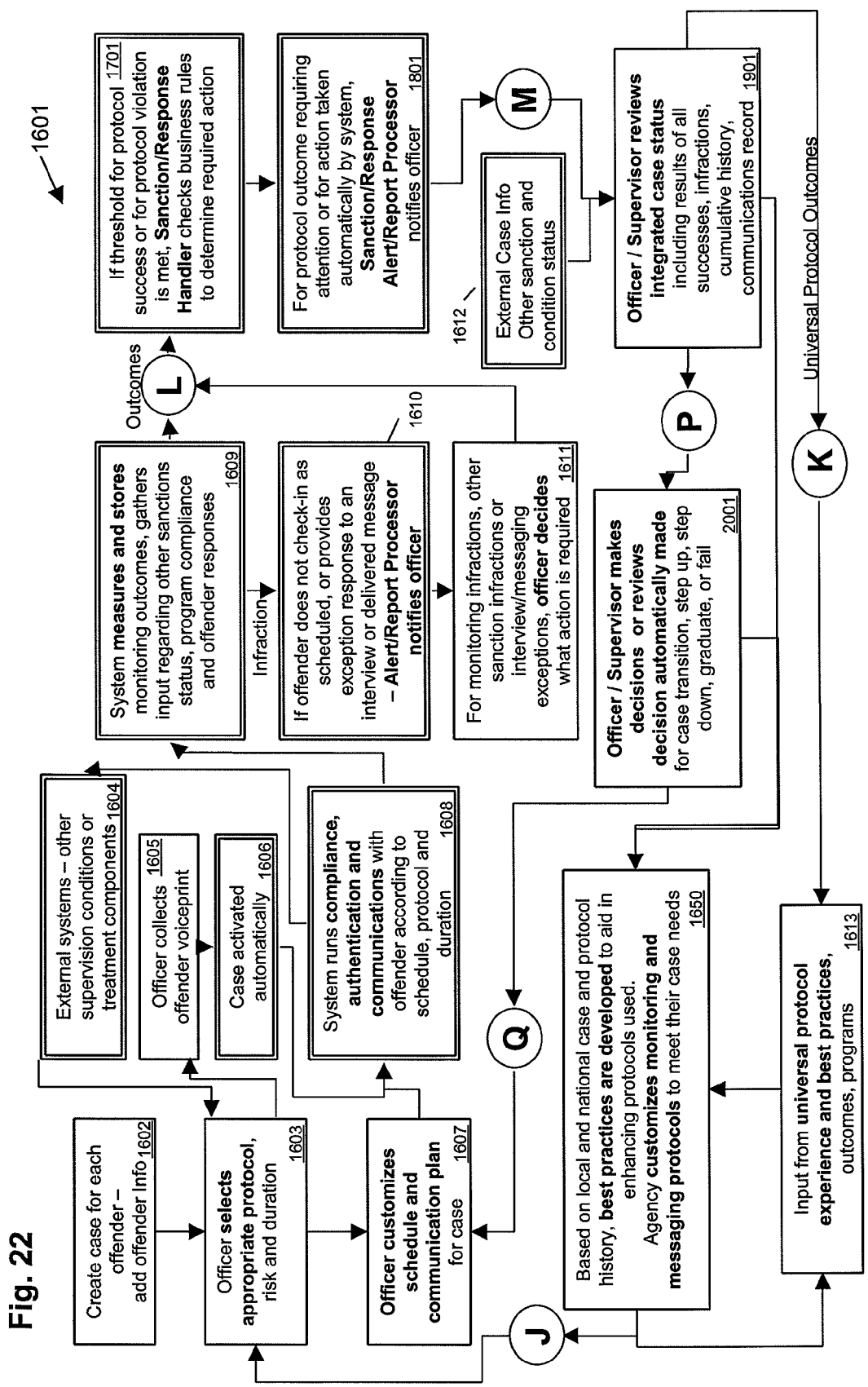
FIG. 22 is a flow diagram illustrating an exemplary graduated response method in an embodiment of the present invention.

With further reference to FIG. 22 and continuing reference to FIG. 4, the system creates a voice biometric (voiceprint) from a set of utterances supplied by the subject during the enrollment process at step 112. Normally, a subject voiceprint is collected by an officer at step 1605, but may also be collected via a method not requiring the presence of an officer. Following successful voiceprint collection, the case for a subject is automatically activate at step 1606. A voiceprint is a statistical model of a person's speech that is built using multiple samples of the speaker's voice. This model is represented by a set of parameters that are highly correlated to the individual speaker.

Speaker verification can be defined by two primary metrics—false accept rate (FA) and false reject rate (FR). The false accept rate is the percentage of imposters that will be verified as the true speaker, and the false reject rate is the percentage of true speakers that will NOT be verified as the true speaker. Subjects are verified using their individual voiceprints and with verification models with pre-set verification thresholds (the thresholds will range from moderate security, to very high security).

In the embodiment of the invention, subject voiceprints are captured during an enrollment that consists of gathering six to eight samples of 8 digit utterances (numbers one to nine). Within the samples, there will be at least three exemplars of each digit. Referring to FIG. 2 the model parameters are extracted and the Nuance verification engine 53 creates the voiceprint. After capturing the subject's voiceprint, the voiceprint is tested and validated using a sample check-in session at step 112. After the successful completion of both voiceprint capture and voiceprint validation the subject is able to check-in to the system.

With further reference to FIGS. 3 and 4, during the check-in process at step 103 the system authenticates (validates the caller) 106 by using their voiceprint that is stored in the voiceprint database 75. The system will prompt the user to repeat some number (two to five) of eight-digit utterances. With reference to FIG. 2, the Nuance verification engine 53 will gather the metrics from the check-in utterances and compare those metrics with the metrics from the subject's voiceprint at step 104. The verification process is enhanced (accuracy improved) by utilizing a verification model (grammar) that is optimized for various groups of speakers. At run time the appropriate model can be selected at step 113 and used to verify the subject. In consort with the Nuance verification process the system gathers and analyzes data from the subject's verification scores and uses this information to augment the results from the Nuance verification engine at step 114. If the metrics pass a pre-determined, verification threshold (based on system security level setting, as associated with offender risk level, established and set in the case configuration file 202 as shown in FIG. 8) then the subject is identified as a true speaker, if the subject does not pass then they are identified as a potential imposter. If the metrics pass a pre-determined, adaptation threshold then the subject's voiceprint is adapted (to further enhance the quality and accuracy of the voiceprint verification upon subsequent check-ins) using the current check-in samples. If the system cannot confirm the caller as a true speaker then a failed check-in record will be created and stored in the data store 209, and the Fail Verify Speech Analysis process is initiated 105 (FIG. 6).

With continuing reference to FIG. 4, in one embodiment, the system selects and uses custom speaker verification models (grammars) at step 113 to verify subject. The models at step 113 are used to improve the effectiveness of speaker identification by maintaining low false accept rates (imposter passing as true speaker) while significantly reducing the false reject rate (true speaker fails verification).

The system places the subjects into one of N groups based on sex, ethnicity, or other distinguishing voice pattern characteristics. Each group is be defined by a common set of verification characteristics that distinguishes one group from another group. For example, all high-frequency, female speakers could be placed into the same group. Each group of subjects then has an associated speaker verification model. The model for each group is selected and/or tuned to have optimal verification performance (for the group). For each group a verification grammar is created from the selected model (for that group). During the check-in process, the system: (1) selects the verification grammar to use for a particular subject based on their biographic information found in the case configuration file 202 (FIG. 8), (2) their association with a particular speaker verification class based on measured speech patterns, and (3) verifies at step 104 the subject using the selected verification grammar at step 113.

In one embodiment of the invention, the system enhances verification performance (improves accuracy by lowering the false-reject rate) by comparing statistics from a set of same user verification scores/metrics (from previous check-ins) with the metric/scores from the current check-in at step 114 to classify the current voice verification result (e.g. strong pass, soft pass, soft failure, hard failure). This classification can be used as follows: high-risk voice monitoring subjects might pass only upon a strong pass; middle to low risk voice monitoring subjects might pass on strong or soft pass; most voice messages (court dates, office visits, payment reminders) could be delivered with soft fail or better, while other messages (drug test notification) might require a higher level voice authentication score. Reports that enable appropriate follow-up on "boundary situations" (e.g. a soft pass allows a message to flow, but requires a subsequent follow-up, or submittal of the same message at the next opportune time).

With further reference to FIG. 2 and continuing reference to FIG. 4, the Nuance speaker verification engine (or Speech Recognition and Verification Server) 53 returns a final, numeric score that indicates the level of confidence of the verification system (positive numbers indicate a true speaker, negative scores tend to indicate a potential imposter). The system gathers verification scores from a statistically significant number of check-in sessions. The mean and standard deviation metrics are calculated from that data set. From these metrics, a 'range of likely valid verification scores' is generated. At the conclusion of the subject's verification session 106 the final verification score is evaluated. Based on distance measurements between the statistics from the previous check-ins ('range of likely valid verification scores') and the scores from the current check-in, a final classification is made. The final determination of the verification session (pass or fail) is a combination of: (1) the value of final verification score and (2) and the classification of the session (strong pass, soft pass, soft failure or hard failure). After each verification session the 'range of likely valid verification scores' is recalculated based upon the outcome of the current session.

With further reference to FIG. 6, if the system is not able to conclusively verify the subject's identity during a check-in (due to voice verification failure) the support engineers evaluate and resolve the failed verification result via the failed verify review process 105. First, the current verification scores of the failed check-in are compared with prior successful check-ins and enrollment data. Previous verification scores show: (1) trending in the subject's verification scores, (2) typical ranges for the subject's verification scores and any significant discrepancies, (3) any individual scores for the failed check-in that passed verification and (4) verification scores on the same random 8-digit strings from prior check-ins. This comparison gives a preliminary indication of whether the intended subject was on the phone or was an imposter. Next, support engineers compare voice recordings from the current check-in with known good samples of the subject's speech (sample digit strings and question responses from the enrollment session). Most people speak in a certain cadence and have a distinct way of saying familiar phrases such as their name, address, or numbers. This comparison can reveal imposters that are not 'close talkers' to the true speaker. This review can also indicate if the caller is using a cordless or cellular phone. The information reviewed includes check-in success ratios, compliance with particular requirements, officer notes and recorded explanations from the subject. After these steps are completed, a determination is made as to whether the reviewer concludes that the caller was the true speaker or a suspected imposter.

Further referencing FIGS. 2, 5, 9 and 23, the administrative portion of the application contains the message administration module 305. The system is capable of fully automated message creation, partially automated message creation, and custom message creation at step 115. All messages have a message classification including positive reinforcement, compliance queries, drug test notification, payment reminders and meeting date reminders. A set of standard messages is available and is used in the protocol administration portion of the application 306 for including messaging components into a custom protocol. These standard messages have default settings for several parameters surrounding the delivery of the message including delivery settings (timed, event based or triggered), retry settings, authentication settings, and delivery method (outbound, inbound or follow up). All of these settings can be customized at the time of inclusion into a protocol to fit the specification outlined by the customer in the control document at step 1659. The message settings can also be customized for an individual case through a Schedule Request submitted by the officer that contains any adjustments needed for message delivery. Each agency has a master calendar for events that are common to most subjects and/or officers (e.g. holidays, and other system wide events). This reduces need for officer to define these calendar events for each of their cases. In addition, there is an officer calendar—for events tied to an individual officer's schedule (holidays, days off, unavailable). This is a dynamic calendar, and can be automatically and continually refreshed through an external system connection 57 from their everyday calendar (such as Microsoft Outlook, or an electronic management system). This reduces need for an officer to define an event via data entry that already exists in electronic form on another information system. For each subject there is an individual subject calendar—for events tied to an individual case schedule (office visits, drug treatment, group meetings, NA meetings, etc.) that may or may not be contained in electronic form on an agency information system.

With further reference to FIG. 8, and continuing reference to FIG. 5, in one embodiment, after the subject has completed the voice authentication process 106 (FIG. 4), the system checks to see if there are messages at step 115 to be delivered to the subject, and stored in the case configuration 202 and triggered via the protocol business rules 205. At time of check-in, business rules 205 are checked to see if any conditions exist that require a message to be delivered (such as a meeting reminder, a positive reinforcement message regarding their solid compliance record, a negative reinforcement reminder that their recent failures may lead to further consequences, etc.)—at the beginning of the call (before verification), or after the verification portion of the call. If the caller has passed voice verification then the system will deliver all outstanding verification-required messages to the subject at step 118. If the caller did not pass voice verification the system may deliver certain classes of messages that do not require authentication at step 119. Based on the outcome of the current check-in (subject was on-time, late, bad location, failed verification), or if the subject missed the previous check-in, the system may select additional messages to be delivered to the subject at step 116.

With further reference to FIG. 3 and continuing reference to FIG. 4, in one embodiment, once a message has been created and scheduled for delivery, it can be retrieved during an check-in call or it can be delivered as part of an outbound notification message at step 102. The system will notify the caller that they have some number of messages and then commence message playback. The system will obtain the next message from the system message queue 62 and play the messages to the subject. At the end of message playback the subject will have the opportunity to hear the message again. Upon completion of the delivery of a message, the next message in the queue will be selected and played to the subject, this process will be repeated until all scheduled messages have been played. The subject may hang up the phone (terminate the session) at any time. Messages that have not been played will remain in the message queue.

With further reference to FIGS. 4, 5, 8 and 9, in one embodiment, once a message 309 has been created and scheduled, a condition test 107 determines when it can be delivered during a check-in call at step 103 by the subject or can delivered to an unattended phone as part of an outbound notification message at step 102. The verification results in a classification (strong pass, soft pass, soft failure, hard failure) from the verification session at step 114 determines which messages will be delivered to the subject. If the subject's verification results are classified as passing or 'soft fail' then the system delivers general messages 118. If the subject's verification results are a 'strong pass' then the system delivers secure messages at step 119 to the subject. The system, depending on the message's receipt parameters determined at step 116, will at step 117 either: (1) play only the message (without any receipt confirmation), (2) confirm that subject heard the message, (3) confirm that message was delivered to the subject, or (4) confirm that subject understands the message and will comply with the message request (if appropriate). The system can request and capture responses to delivered messages—yes/no answers and other codified responses are captured and reported as data results; verbal responses and explanations captured and stored as audio files (with optional conversion of the audio responses—speech to text) based on parameters related to the delivered message. The subject can hang up the phone at any time (terminate the session) and/or refuse to confirm the delivery of a message. Messages that were not delivered to the user (either not played or not confirmed—where delivery confirmation was required) remain in the message queue 62. The system continues to attempt to deliver undelivered messages during subsequent check-in sessions (for subjects on Monitoring, or not) and/or periodically notifies subject via outbound notification until the subject has successfully retrieved the message. If a scheduled message is not delivered successfully on time (delivered to the subject by the message delivery date), the message delivery is flagged as a late delivery in the data store 209 for subsequent automated response handling 205 and exception report processing 206. If a scheduled message is not delivered successfully (never delivered to the subject), the message delivery is flagged as incomplete in the data store 209 and subsequent automated response handling 205 and exception report processing 206. The system will report the outcome of the message delivery attempt(s) regardless of the methods used to generate or schedule a message; the outcomes of message delivery are available via online reports 108 to the authorized personnel at an agency. The information reported includes: (1) attempted delivery dates/times, (2) successful delivery data and time, (3) responses received from subject—available at a message level, as well as an aggregate case level view (across many related events), and (4) critical or important exception reports—items that are timely to ongoing case management plan (i.e. office visit message not confirmed, drug test notification not confirmed).

Figure 9:
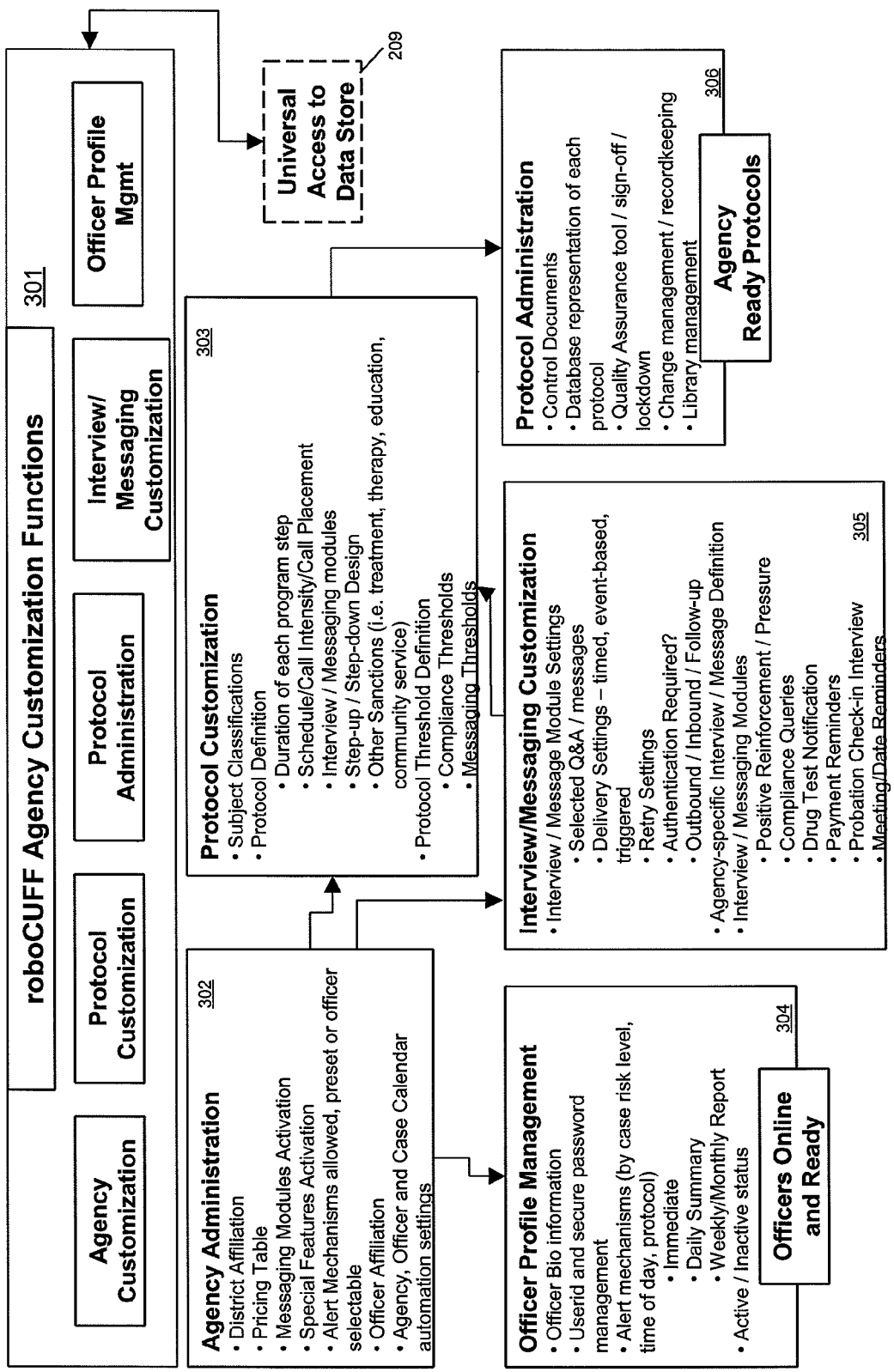
FIG. 9 is a block relational diagram an exemplary framework of the agency customization modules in an embodiment of the present invention.

With further reference to FIGS. 6, 8 and 9, in one embodiment, after the subject has completed the voice authentication process 106 (FIG. 4), the system checks to see if there are interviews at step 120 to be delivered at step 126 to the subject, and stored in the case configuration 202 and triggered via the protocol business rules 205. The interview session provides a fully automated capture of essential information. Each agency will define a set of voice interview forms 305 and subject classifications that enable fast and simple case set-up for each subject. The subject will be told that they have one or more interviews to be completed. The system will select the first interview and then commence the interview dialog. The interview will consist of one or more questions that are presented to the subject, such as "Are you still at the following address—street number, street name, city, state and zip?" looking for a Yes/No response. If No→"Please say your new address at the tone."; "Are you still working at the following employer—employer name and address?" looking for a Yes/No response. If No→"Please say your new employer's name, address and supervisor's name and phone number."; "Have you been contacted by the police in the last XX days?" looking for a Yes/No response. If Yes→"Please explain the circumstances and provide the police contact name and court to which you must report". The interview can be either static or dynamic. In a static interview 121, the number of questions and the sequence of questions is pre-determined. When the subject completes a question, the next question in the sequence is presented to them. When the subject has completed the last question the interview is completed. In a dynamic interview 122, the number, type and order of the questions is determined by the subject's response to questions and the interview parameters. For example based on the subject's response to a particular question the system may present one or more follow-up questions. If the subject hangs-up (session termination) prior to the completion of an interview the interview will be marked as incomplete. The system will attempt to deliver at step 126 the interview to the subject at the next check-in session. If a scheduled interview is not delivered successfully on time (delivered to the subject by the interview delivery date), the interview delivery is flagged as a late delivery in the data store 209 for subsequent automated response handling 205 and exception report processing 206. If a scheduled interview is not delivered successfully (never delivered to the subject), the interview delivery is flagged as incomplete in the data store 209 and subsequent automated response handling 205 and exception report processing 206. The system will report the outcome of the interview delivery attempt(s) regardless of the methods used to generate or schedule an interview; the outcomes of interview delivery are available via online reports to the authorized personnel at an agency.

Figure 7:
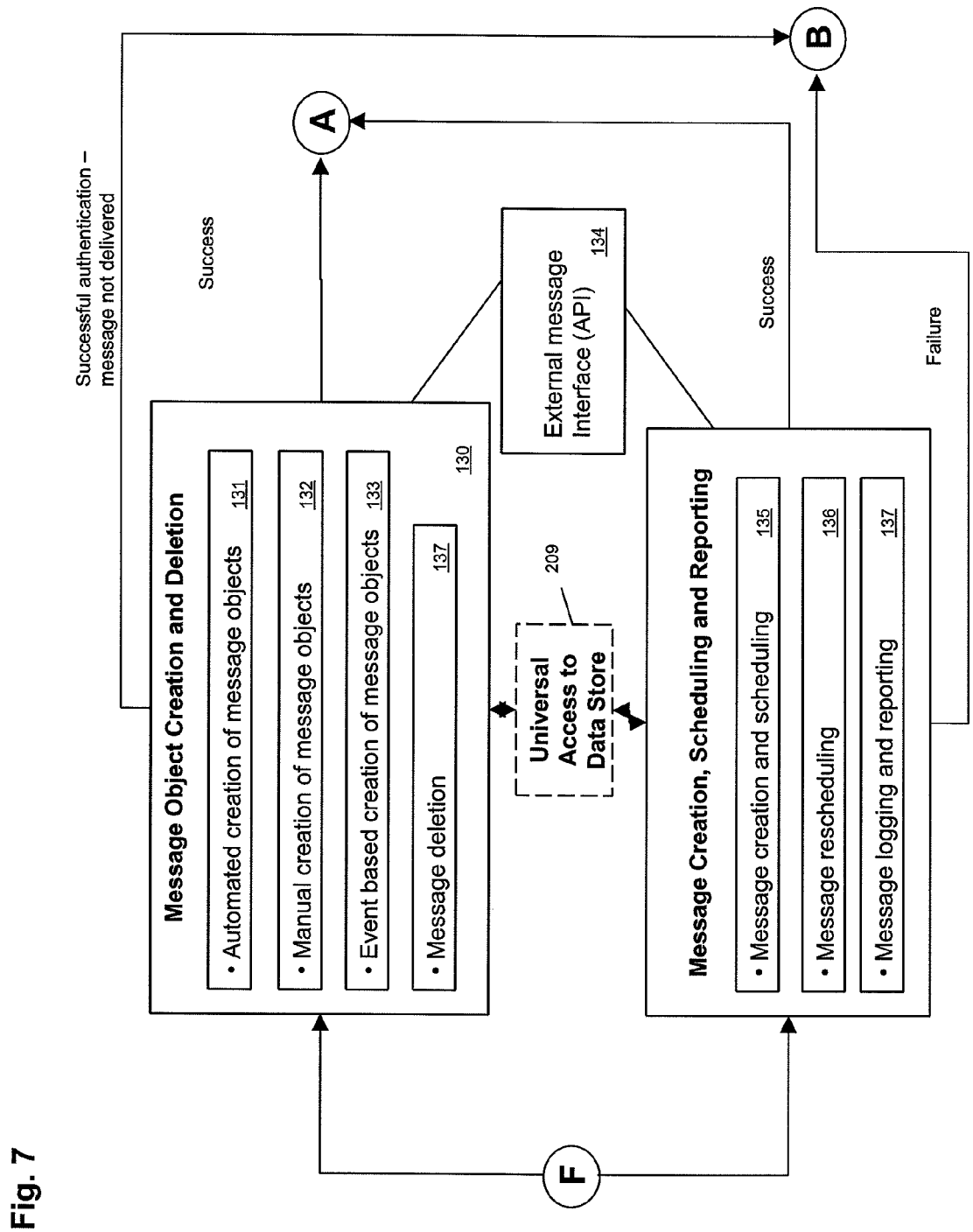
FIG. 7 is a block relational diagram an exemplary framework of the supporting messaging mechanisms in an embodiment of the present invention.

Further referencing FIG. 7, with continuing reference to FIGS. 2, 3 and 9, in one embodiment, message objects are created at step 130 in the system and stored in the database 62. Message objects can be automatically created at step 131, and their delivery schedule determined, based on interview/message customization parameters 305. Message objects can also be created by requests from external systems 57. In this case, the message requests are delivered to the system via an external messaging interface at step 134. The message interface interprets the message request, creates the message object and reports the results back to the external system. The message objects create one or more messages that notify the subject of an upcoming event (e.g. officer appointment, court date, counseling appointment, community service event, testing notification, payment reminders, etc). Message objects can be manually created at step 132 by users accessing message creation pages of the web application 76. Messages objects can also be created base on the occurrence of events in the system at step 133 (e.g. successful completion of one or more of check-ins, failure of one or more check-ins, success or failure of testing outcomes, payment reminders, protocol activities or protocol transition events, missed appointment notifications, etc). Based on the parameters and settings in the protocol of the message object 305, the system will create and schedule one or more messages at step 135. Each message will have a start date, stop date, an implied duration, delivery window(s), delivery parameters, priority setting, security requirements, and delivery logging and reporting parameters. Messages can be scheduled for delivery during outbound notification calls, inbound check-in calls or both. Based on user input or system activities, one or more messages, associated with a message object and its associated protocol 305, can be rescheduled at step 136. For example, if an appointment date is moved, the system can generate one or more messages that notify the subject that the event has been rescheduled for another date/time. Based on user input or system activity message objects can be deleted 137 as well. When a message object is deleted, undelivered, scheduled messages, associated with the message object, will also be deleted. If one or more of the messages, regarding the event, have been delivered to the subject, then the system may generate an event cancellation message and schedule it for delivery. All attempts to deliver messages are logged in the data store 209. Successful delivery of messages at step 137 is logged to the data store 209. An unsuccessful delivery at step 137 is also logged to the data store 209.

Figure 10:
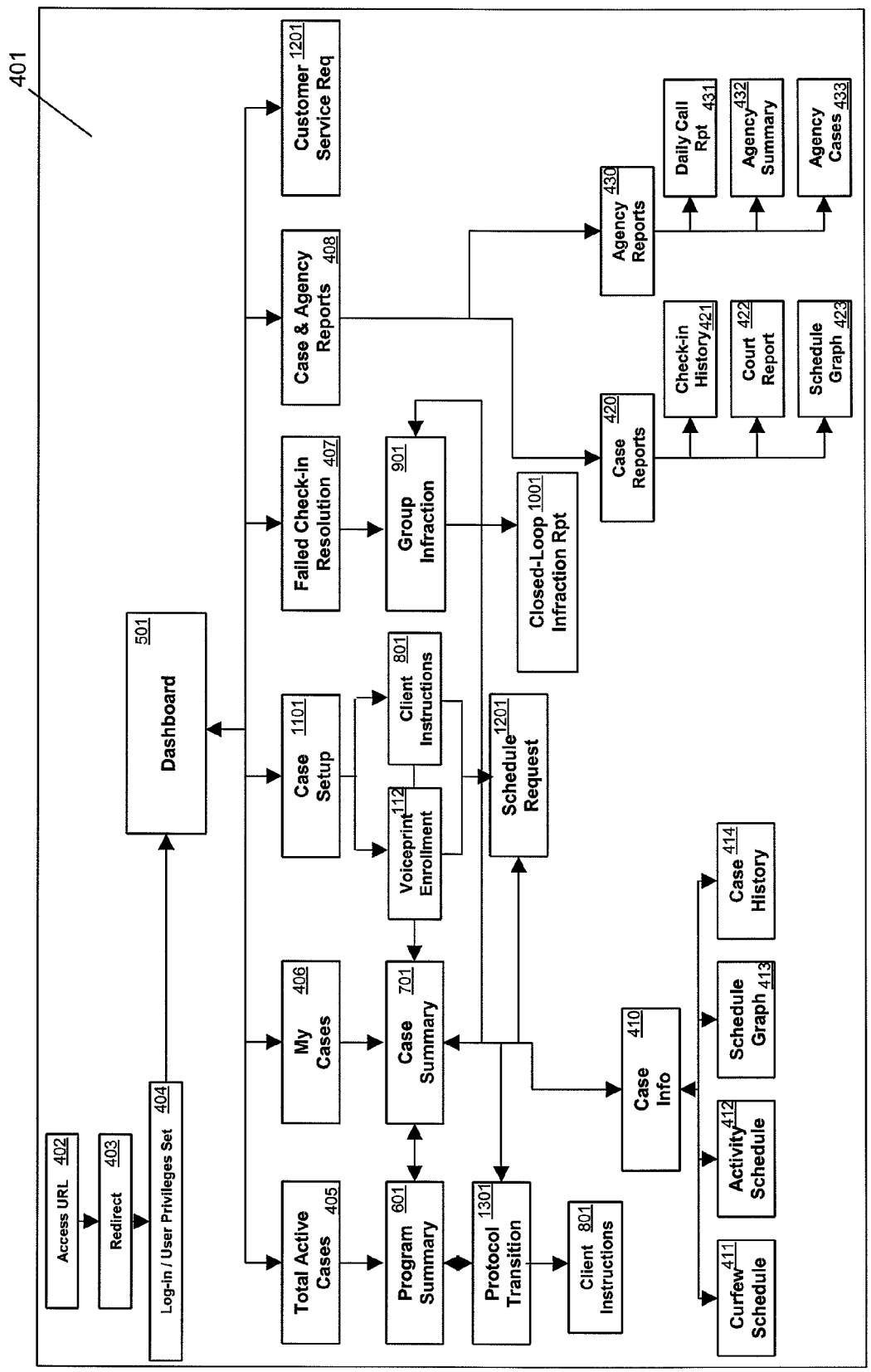
FIG. 10 is a block relational diagram illustrating an exemplary structure of various user displays in an embodiment of the present invention.

As shown in FIGS. 8, 9 and 10, using a pointing device 23, a user accesses the application by opening a browser 38 on a computer and addresses a web browser 38 to the log-in URL 402, whereupon a redirect 403 of the user log-in occurs based on conditions tested from the browser 38 being used to log-in (such as browser used, browser version). Typical users are officers within criminal justices agencies that access the application to perform a variety of tasks including case management 201. The user then logs on with a user identification and password established in the officer profile management module 304. Once a user successfully logs in by providing secure user credentials, user privileges are assigned 404 to that user providing them a personalized and secure view of their pertinent case view. Once access to the system is granted, the Dashboard 501, or Home Page, appears. Using conventional GUI interface devices such as a title bar, toolbars, clickable menus, dialog boxes, quick links, buttons, status bar and others, the user navigates throughout the displays, bringing other displays in focus. The clickable menus and quick links gain access to the different areas of case management content shown in FIG. 8 such as offender case configuration 202, infraction handling 203, case review 208 and officer response to automated sanction recommendations 205. The display appears with a drop-down list of all offenders 406 available for review by the officer, and the officer can choose to view information relating to any particular offender at anytime from any screen. On the dashboard, a user may select a link to Case and Agency reports 408, that provides a consolidated view of the many reports available for their caseload. The Case level reports 420 include a case history 421 for all interactions and events for each subject, a view of a court report 422 containing a list of all infractions as noted by the officer, and the schedule graph 423 depicting the supervision and treatment schedule for any subject. The Agency reports 430 available include the daily call report 431 containing a listing of all events having been scheduled and/or occurred on any given day, the agency summary report 432 that provides an aggregate case report on outcomes across all cases for a selected period, and an agency case report 433 that provides a detailed summary of case outcomes across a specific caseload.

Figure 14:
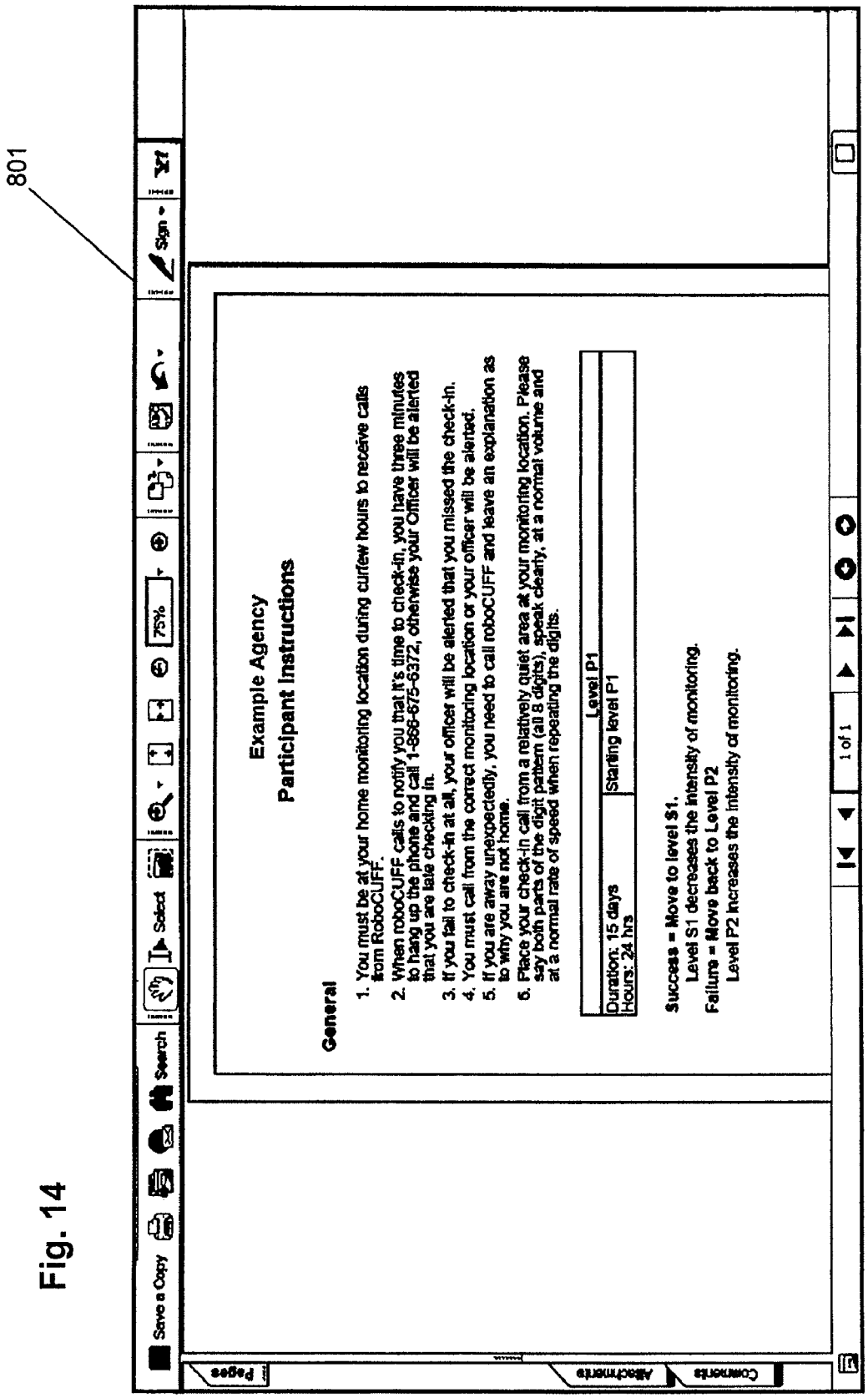
FIG. 14 is a screen display of a browser window showing an exemplary set of printable client instructions in an embodiment of the present invention.
Figure 15:
FIG. 15 is a screen display of a browser window showing an exemplary group infraction handling display in an embodiment of the present invention.

With further reference to FIGS. 14 and 17, and continuing reference to FIGS. 8 and 10, under the case configuration 202 the Case Creation screen 1101 is used to enter case information. This information includes offender biographical information, such as name and phone number, protocol name and protocol step. Once a protocol step is selected, a description appears listing the supervision components and treatment elements associated with that protocol level. Those components and elements could include the monitoring schedule, monitoring intensity, messaging modules activated, interview package and related frequency, and treatment alternatives such as education or community service 1102. Additional information related to the protocol such as risk level (high, medium, low) and alert level (immediate or 24 hour summary) are also available for selection. Assigning a particular protocol for a case establishes the potential incentives or consequences for compliant or non-compliant subject behavior while the selected risk level controls how many infractions or exceptions are allowed prior to a Transition Recommendation being generated by the sanction/response handler 205. Starting dates and (optionally ending dates) for monitoring are also entered through this screen. Once all pertinent information for the case has been entered, the application generates offender instructions outlining the monitoring and treatment plan for the case 801. These instructions are prepared and formatted for the subject to receive from the officer providing a clear understanding of the expectations set in front of them and may also be available for delivery through the messaging system upon subject request during a check-in.

Further referencing FIG. 4 and continuing reference to FIG. 10, in order for the application to begin monitoring the subject, a voiceprint must be collected at step 112 from the subject. The enrollment information for the voiceprint is automatically generated by the application and is displayed to the officer after they have submitted the case set-up information 1101. The results of the voiceprint enrollment are stored into the data store 209.

Figure 11:
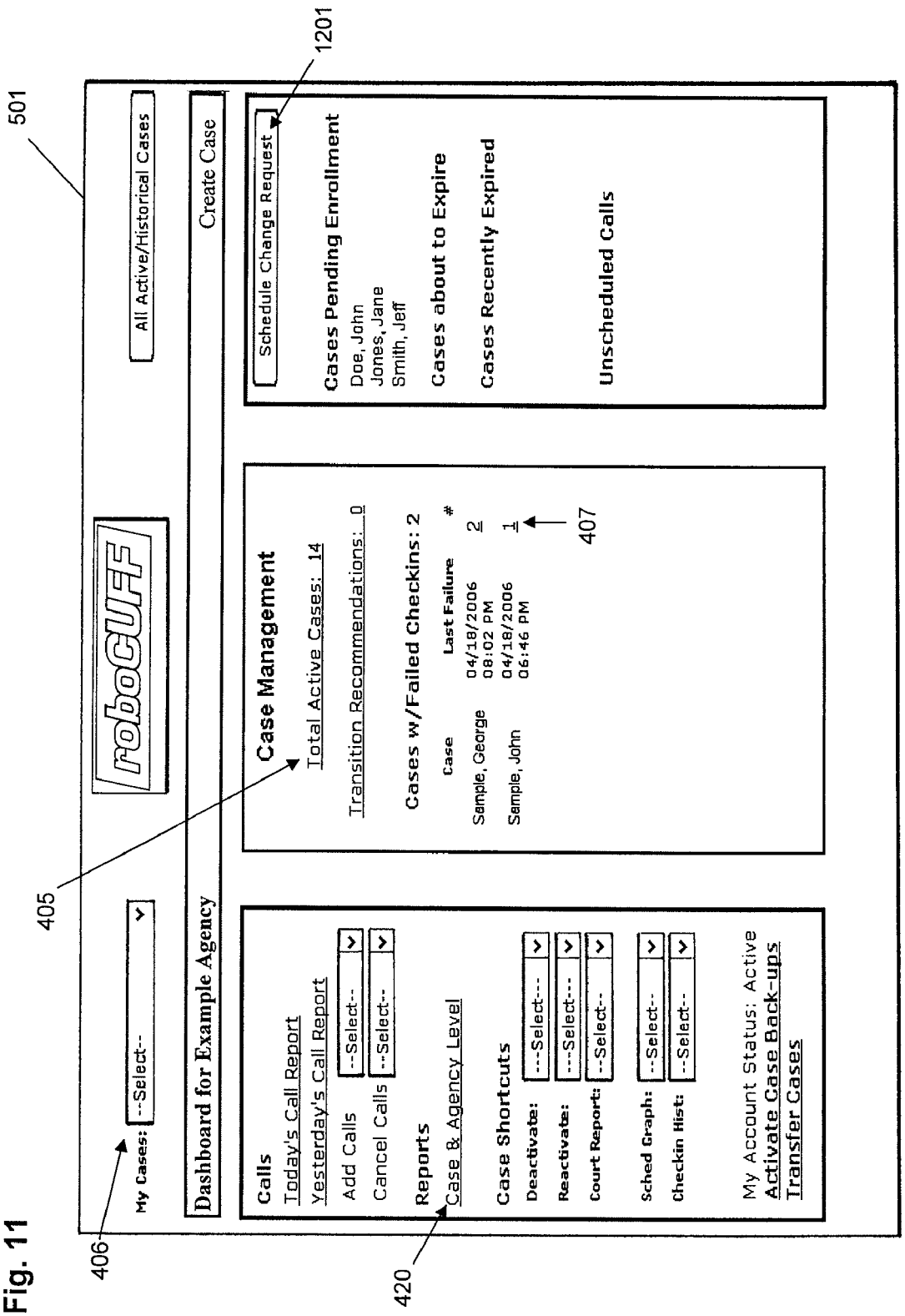
FIG. 11 is a screen display of a browser window showing an exemplary dashboard (home page) in an embodiment of the present invention.

Further referencing FIG. 11 and continuing reference to FIG. 10, if the monitoring schedule, or any other supervision condition or treatment alternative set by the protocol needs to be adjusted, a Schedule Request 1201 can be sent by clicking on the Schedule Request button 502 and typing in the adjustments needed. This action sends an automatic message to customer support with the requested changes. The changes are completed and a confirmation is sent back via email to the requesting officer confirming that the changes have been made. The history of all schedule and protocol change requests is entered into the data store 209 and is available for reporting.

Once the case configuration information and voiceprint enrollment at step 112 is completed, the offender begins to receive the appropriate monitoring, messaging, interview communications via the telephone and other protocol managed components begin at step 1608 (FIG. 22).

Further referencing FIGS. 8, 9, 15 and 16, and continuing reference to FIGS. 10, 11, and 22, when a monitoring exception, treatment exception, interview exception or messaging exception occurs at step 1610, an alert is generated and stored in the system pending further processing by the infraction handler 203 and alert processor 204. The Dashboard 501 conveniently and automatically displays these alerts and exceptions that require attention. Check-in exception alerts can also be communicated through the alert processor 204 via email, telephone, pager or text pager immediately after a exception, as well as through a daily email summarizing the results of all check-ins and exceptions during the past 24 hour period, according to how an officer directs notification 302.

Unresolved check-in exceptions and other exceptions are displayed in a summary list (generated through the process set forth in steps 1609, 1610 and 1611) on the center panel of the Dashboard (407, 501). The number of unresolved exceptions for each case on this list has more depth, viewable by mousing over the digits and selecting, bringing into focus a display having more detailed information called the Group Infraction Handling screen 901. Included on this screen are the date and time of the check-in exception or other exception as well as the type. All unresolved exceptions for a case are listed along with action buttons used to resolve the item to produce a closed loop report. A check-in exception or other exception is resolved by marking it as an Infraction, as Excused (Officer Judgment) or as Excused (Prior Arrangement). The selected action is applied to a particular exception or multiple exceptions by clicking the checkbox next to the appropriate exception. Investigation/Resolution comments can be entered for one or many exceptions. All of this information is entered into the data store 209 and can be viewed through the Case History or Court Reports for an individual subject.

Each exception entry has more depth, viewable by mousing over the entry and selecting, bringing into focus a display having more detailed information called the Closed Loop Infraction Report 1001. From notification call time(s) to a listing of recent failures for that case, all pertinent information is displayed along with a link to any recorded messages associated with that check-in or message. The same resolution choices on the Group Infraction Handling screen are available on the Closed Loop Infraction Report.

Further referencing FIGS. 5, 20, 24, 25 and 26, and continuing reference to FIGS. 8 and 22, using the output of at step 1609, the application keeps track of the sanction compliance for each case and generates Transition Recommendations (TR) and exception responses at step 1701 based on the measured compliance. If the compliance is good, a reward TR and/or a positive reinforcement message event is generated which recommends moving the case to a less-intensive monitoring level within the protocol as a reward for compliant behavior and this information is communicated to the subject during a subsequent check-in. If compliance is poor, a negative reinforcement message and/or a penalty TR is generated which recommends moving the case to a more-intensive monitoring level within the protocol as a penalty for non-compliant behavior. In some protocols, a warning message will be communicated prior to the penalty TR so that the subject has a chance for corrective behavior. To generate the correct exception responses or TR's, the application compares the number of actual infractions and exceptions for the case against the infraction thresholds and message triggers for the assigned. For example, if an infraction counter reaches a message trigger at step 1704 prior to an infraction threshold, the subject can receive a negative reinforcement message 116 reminding them of the potential consequences for continued non-compliance. Continuing the example, if the measured outcome at step 1702 shows additional infractions that trigger the infraction threshold, a penalty TR is generated at step 1704, and a the officer is notified at steps 1802, 1806 and 1807 by email that this subject has a TR pending their review at step 1902 and approval at steps 2002 and 2005. If the current infraction and exception total remains less than the infraction threshold for that case over a period of time set by the assigned protocol 202, a reward TR is generated automatically at step 1703 as well as a positive reinforcement message 116. For example, if the duration for a phase of a protocol is 30 days, and there are no infractions recorded at step 1702 after 25 days, the message trigger at step 1703 prepares a positive reinforcement message reminding the subject that they have made good progress and are only five days away from successfully completed this stage of their protocol. Continuing this example, if after five more days, the infraction threshold has not been met at step 1702, then the sanction/response handler at step 1703 prepares a TR and a positive reinforcement message for the subject. In this case, the TR is approved for automatic execution at step 1706 and the subject is told 116 that due to his successful completion of the prior stage, that his monitoring period has been moved to a later start time, effective the next day. The sanction/response alert/report processor at step 1803 sends a non-critical message at step 1806 to the officer notifying at step 1807 that the subject has progressed from one protocol stage to the next due to good behavior. TRs are typically communicated via a Transition Notification email that gives the offender's name, the current protocol level, the recommended level and the reason at step 1701 the TR was generated at step 1801. If after an agency-specified duration 302 and at step 1707, there has been no action taken by the officer at step 1804 on a pending TR, a summary transition report at step 1805 is sent to the supervisor including all pertinent information notifying that there is a pending protocol action for the identified subject. The case continues in a state of Transition and is monitored with the current schedule settings until a Transition Action is executed.

In further embodiments of the invention, and more generally, thresholds of a protocol include, for example, time-based, performance-based and event-based variables or settings, and any combinations thereof, including, but not limited to, types of events, passing of time with or without occurrence of an event, number of events, and the occurrence or non-occurrence of an event.

Further referencing FIGS. 10-13, 19, 23 and 27, and with continuing reference to FIG. 8, when a Transition Notification email is received, there are two different courses of action possible—follow or modify a Transition Recommendation or take no action. To evaluate a Transition Recommendation, the officer sees on the Dashboard 501, where information about all recommended transitions is viewable by mousing over the quick link labeled "Transition Recommendations" and selecting, bringing into focus a display called the Program Summary screen 601 filtered to show only the cases with the status of Transition. Each case entry has more depth, viewable by mousing over the entry in the status column and selecting, bringing into focus a display having more detailed information called the Protocol Transition screen 1301. From a description of the transition recommendation to a listing of infractions since the last transition action, the officer may also link to the case summary screen 701 where complete case history, current protocol stage, protocol transition history and infraction threshold counter are all clearly visible. Returning to the protocol transition screen, an officer is able to follow or modify the protocol recommendation. To take action, the officer selects one of the transition action buttons—Move, Reset, Restart and Change Current Risk 208. If Move is selected, a protocol step to move the case to is suggested and required. The application defaults the step selection based upon the TR. If it is a penalty TR, the step would be a step up or more intense supervision. If it is a reward TR, the step would be a step down or less intense supervision. Once submitted, this action automatically adjusts at step 2005 the monitoring schedule and intensity of monitoring based on the new level selected within the protocol. If Reset 207 is selected, the current infraction count for that case is set back to zero. If Restart 207 is selected, the duration count is set to zero (effectively erasing any days served on the current level) and the current infraction count is set back to zero for that case. If Change Current Risk is selected, the desired risk must be selected from the drop down list. Once submitted, the application changes the Infraction Threshold values at step 1674 to match the values associated with the new risk within the current protocol. The transition action is entered into the data store 209 and displayed in the Transition History section of the Protocol Transition screen 1301 and the Case Summary screen 701.

Figure 24:
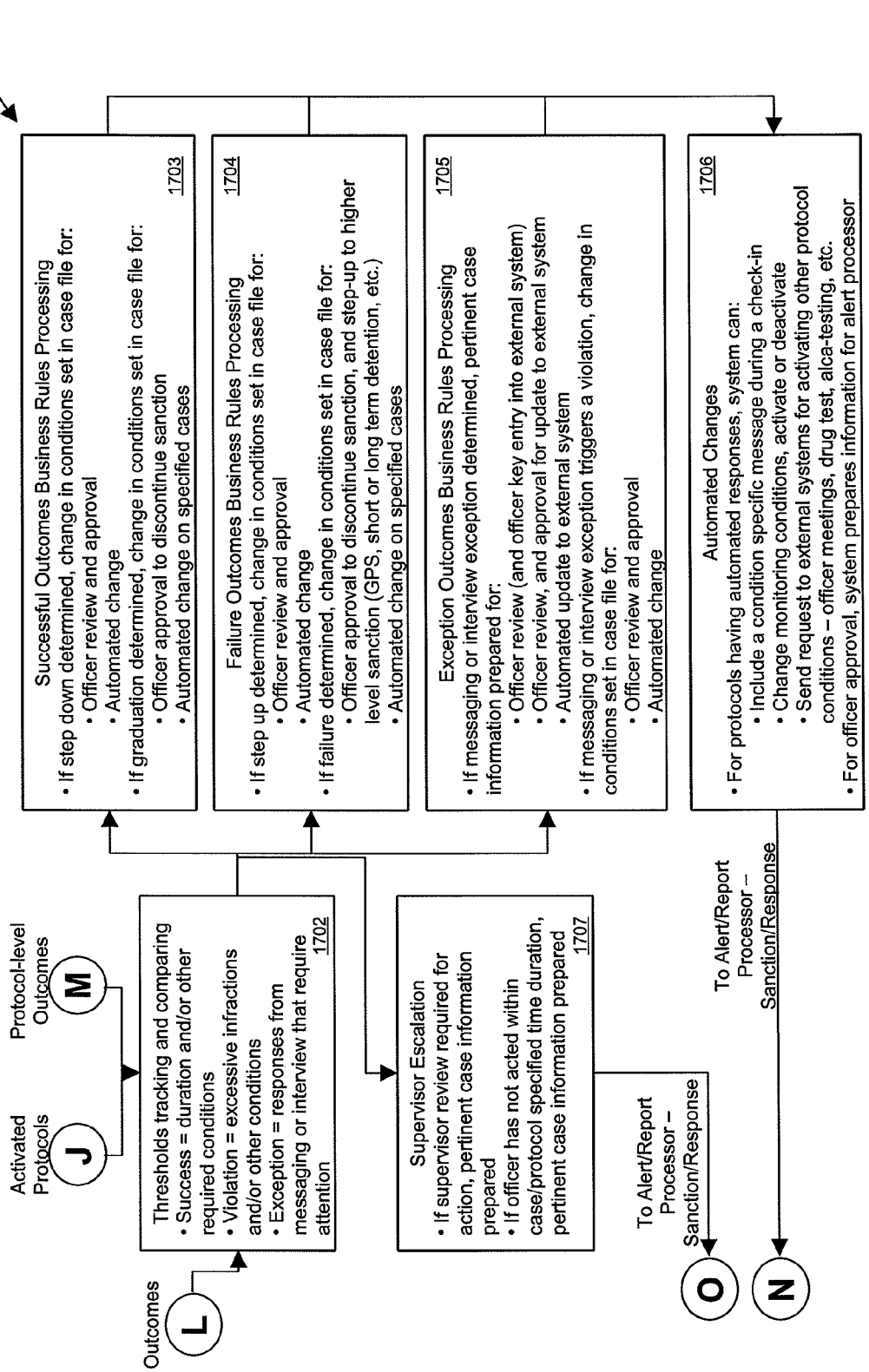
FIG. 24 is a flow diagram illustrating an exemplary sanction/response handling method in an embodiment of the present invention.
Figure 25:
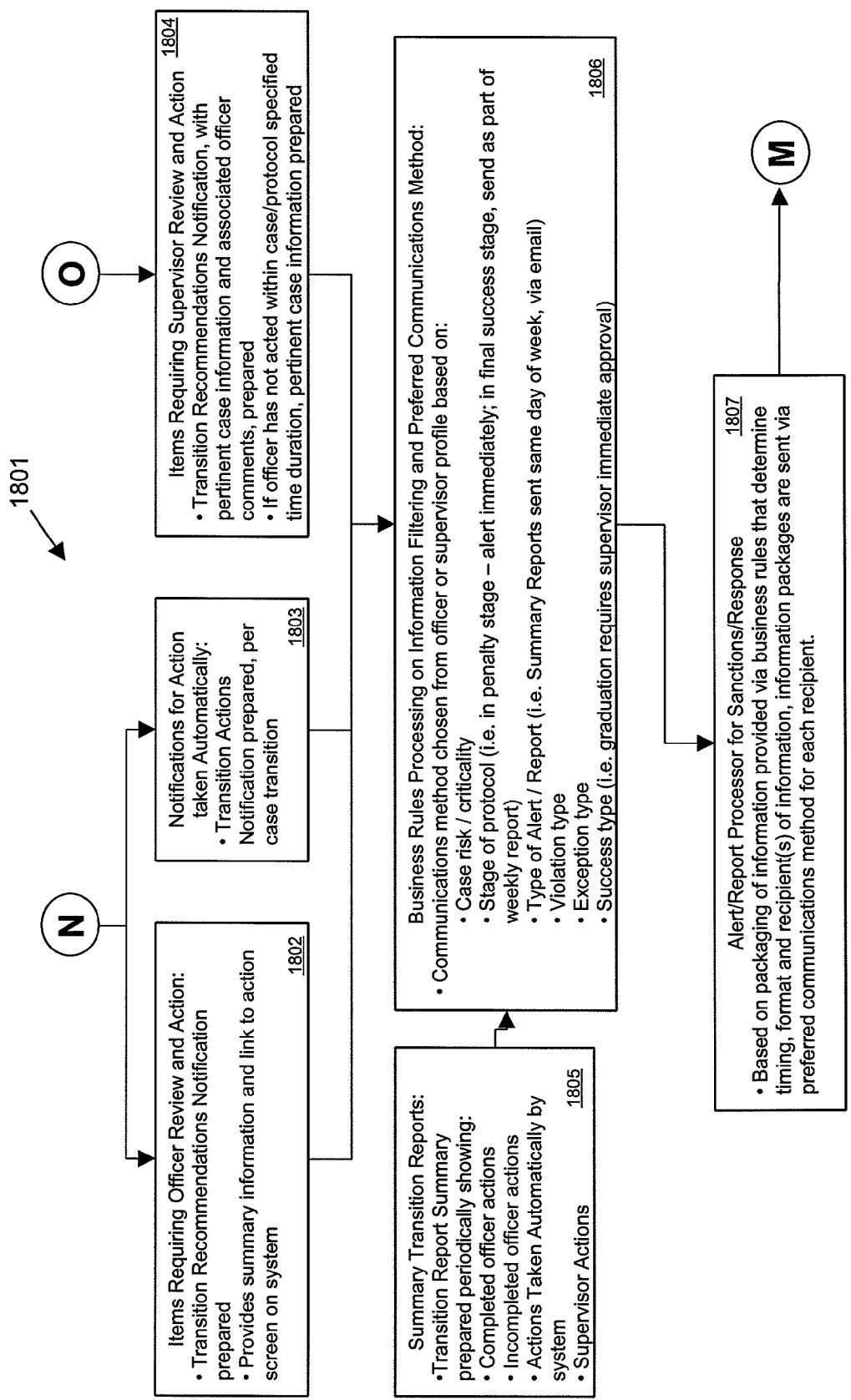
FIG. 25 is a flow diagram illustrating an exemplary alert/report processor for sanction/response method in an embodiment of the present invention.
Figure 26:
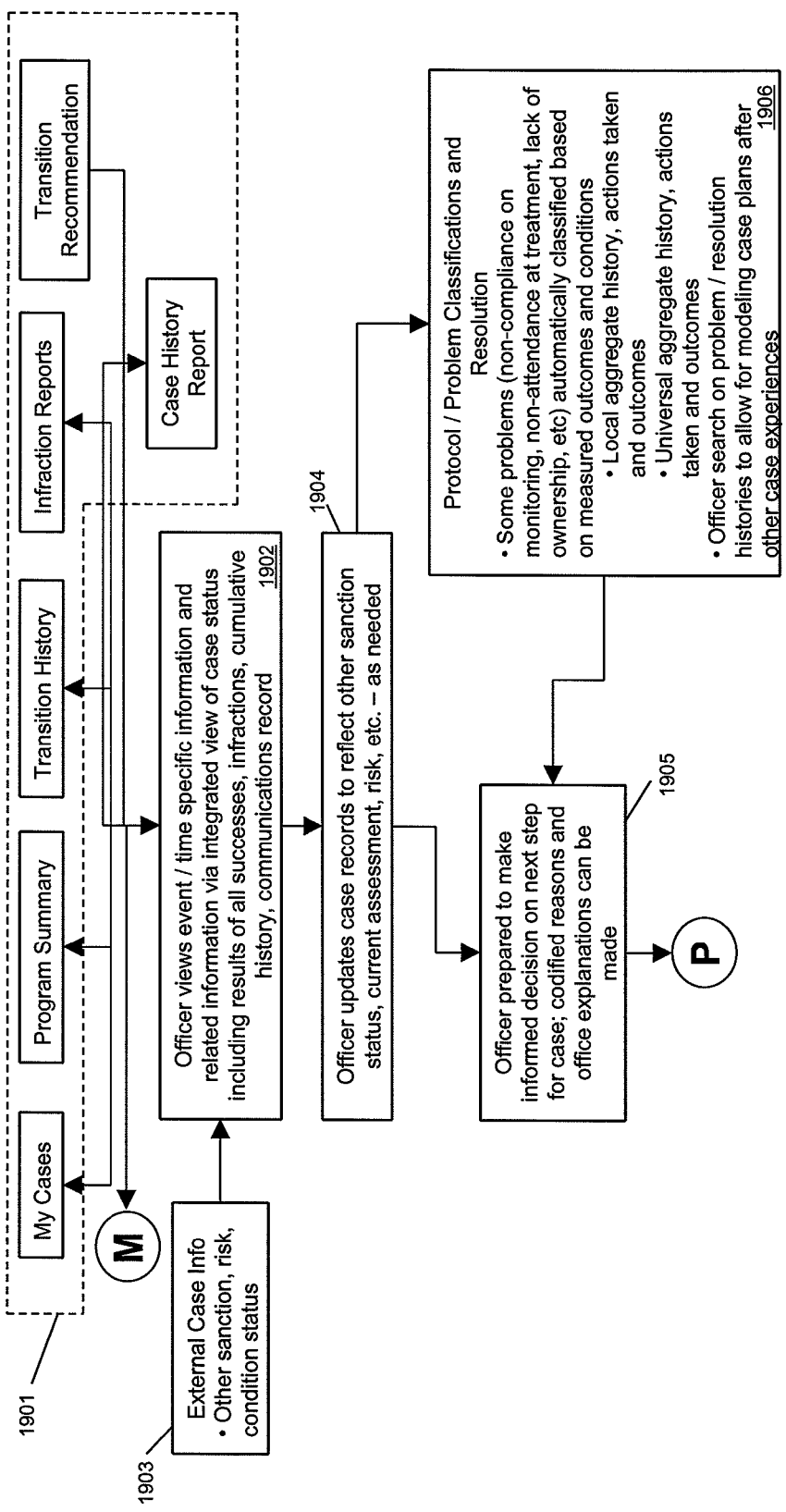
FIG. 26 is a flow diagram illustrating an exemplary officer case review method in an embodiment of the present invention.
Figure 27:
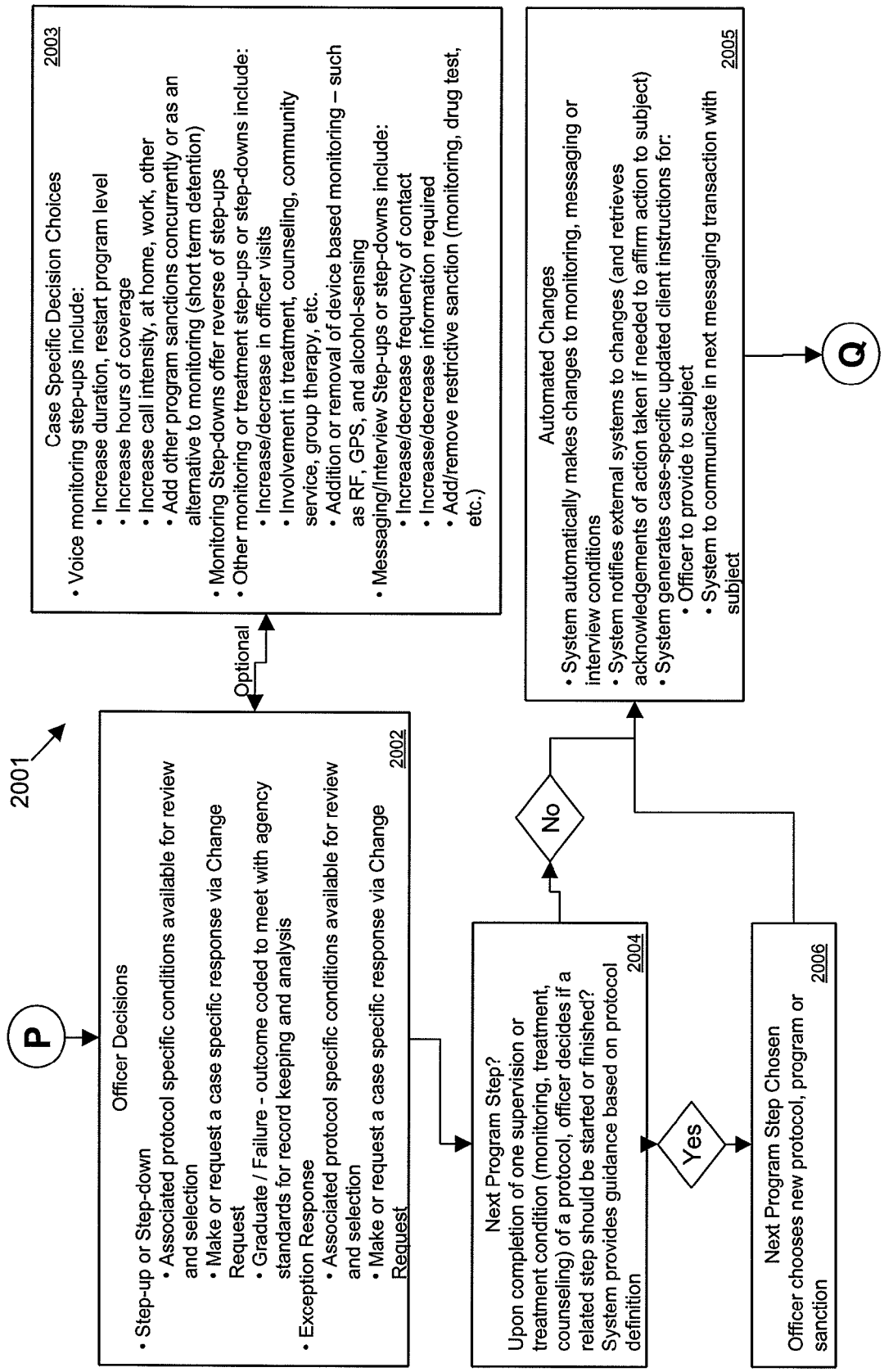
FIG. 27 is a flow diagram illustrating an exemplary case transition method in an embodiment of the present invention.

Further referencing FIGS. 24-26 and continuing reference to FIGS. 10 and 27, when a case reaches the end of the monitoring period and has been compliant with the supervision requirements at step 1702, the application generates a reward TR at step 1703 that recommends the case be moved at step 1802 to the Graduation level within the protocol. Receiving a TR notification at steps 1806 and 1807, the officer is directed to review the recommendation at step 1902, the case can then be moved to level Graduate from the protocol transition screen 1301 and the application automatically completes monitoring at step 2005 and mark the case as a successful completion. Likewise, when a case has moved through all the penalty levels at step 1702 within the protocol due to non-compliance, the application generates a penalty TR at step 1704 that recommends the case is moved at step 1802 to the Failure level within the protocol. Receiving a TR notification at steps 1806 and 1807, the officer is directed to review the recommendation at step 1902, the case can then be moved to level Failure and the application automatically completes monitoring at step 2005 and mark the case as a failed completion. This information is available for agency reporting and can be used to determine summary statistics such as protocol success and failure rates.

Further referencing FIGS. 8 and 11-13, and continuing to reference FIG. 10, from the Dashboard 501, active cases can be reviewed at any time by mousing over the quick link labeled Total Active Cases 405 and selecting, bringing into focus the Program Summary screen 601. In addition to providing an immediate snapshot of the status of each active case (with status noted as OK, Attention, Transition), each case entry has more depth, viewable by mousing over the entry in the name column and selecting, bringing into focus a display having more detailed information called the Case Summary screen 701. This screen can also be reached from the Dashboard 501 by clicking on the drop-down box labeled My Cases 406 and selecting the name of the case to be reviewed. From a description of the assigned protocol to a listing of recent check-ins, all pertinent information is displayed along with the Infraction Threshold matrix displaying the threshold values associated with the risk level of the case and the current infraction values the case has incurred 208. This screen has links to more detailed case information 401, check-in resolution 901, protocol transition actions 1301, schedule and protocol change requests 1201, a graphic schedule display 413 and caseload reports 420 based on the role of the user.

Referring to FIG. 9, agency specific information is setup by support personnel through the administrative modules 301 of the application. The modules designed to create agency-level customization include agency administration 302, protocol customization 303, protocol administration 306, interview/messaging customization 305 and officer profile management 304. These modules combine to create an application tuned to the specific needs of each agency.

Further referencing FIGS. 10 and 17, and continuing reference to FIG. 9, in one embodiment of the invention, in order for the application to operate effectively, agency-specific information must be entered. The agency administration module 302 allows the customization of the following 1) District Affiliation—Districts allow for the separation of units or offices within a single agency. For example, a state agency may have 5 offices across the state. By creating a state agency district and including each office as a separate unit within that district, the application can display case information differently based on the role of the user. Users designated as Directors will see all the cases for the entire district, while Supervisors will see all cases for a unit and Officers will see all directly managed cases. 2) Pricing—Pricing can be customized based on the type of agency, method of payment and any special features included. 3) Messaging Modules/Special Features Activation—these options, as defined inside selected protocols, can be turned "on" or "off" depending upon the needs of the agency, a set of cases, or for a caseload of any officer, and personalization of the settings for each message module to be activated. In addition, the option to deliver certain messages without voice verification is available, or under certain voice verification conditions (soft fail, soft pass, pass, strong pass). 4) Standard Message Definition—labels and text for standard messages can be entered for use in the drop down list on the Case Entry screen 1101. 5) Alert Mechanisms—Alert mechanisms such as immediate failed check-in alerting or summary alerting can be preset for the entire agency or allow for officer selection. 6) Master Calendar—A master calendar for the agency and their local institutions involved with monitoring and management (such as schools, places of work, and treatment facilities) can be customized with holidays, school holidays and other events. For agencies who provide automatic updates to agency, officer and case level calendars (officer appointments, court dates, etc.), settings are made in the agency profile 302 so that fully automated messaging of this type of information is enabled. These calendars will be used in the scheduling of random and/or preset calls (based on school calendars and local holidays), determination of what message and when to deliver messages, delivery location of officer alerts and summary reports.

With continuing to reference to FIG. 9, officers can be associated with an agency or an office or unit within an agency via the officer profile management module 304. The officer profile management module 304 allows the entry of pertinent officer information such as biographical information, user identification and secure password and whether the officer is active or inactive within the agency. If allowed by the agency, alert mechanisms can be set for each officer. These mechanisms include 1) the activation of immediate alerting by case, risk level, time of day and protocol, 2) receiving these immediate alerts via email, telephone, pager or text pager, 3) the activation of a daily alert summary report delivered via email, and 4) receiving weekly/monthly activity reports. Finally, an officer calendar can be customized with officer vacation or other officer specific date information. This officer calendar customization can be entered via application screen or be set to receive automatic periodic updates from an external system 57, as shown on FIG. 2. Once this information is entered, the officer is able to access the application via a web browser 38, and any cases setup by that officer will be associated with the agency to which that officer belongs.

Figure 23:
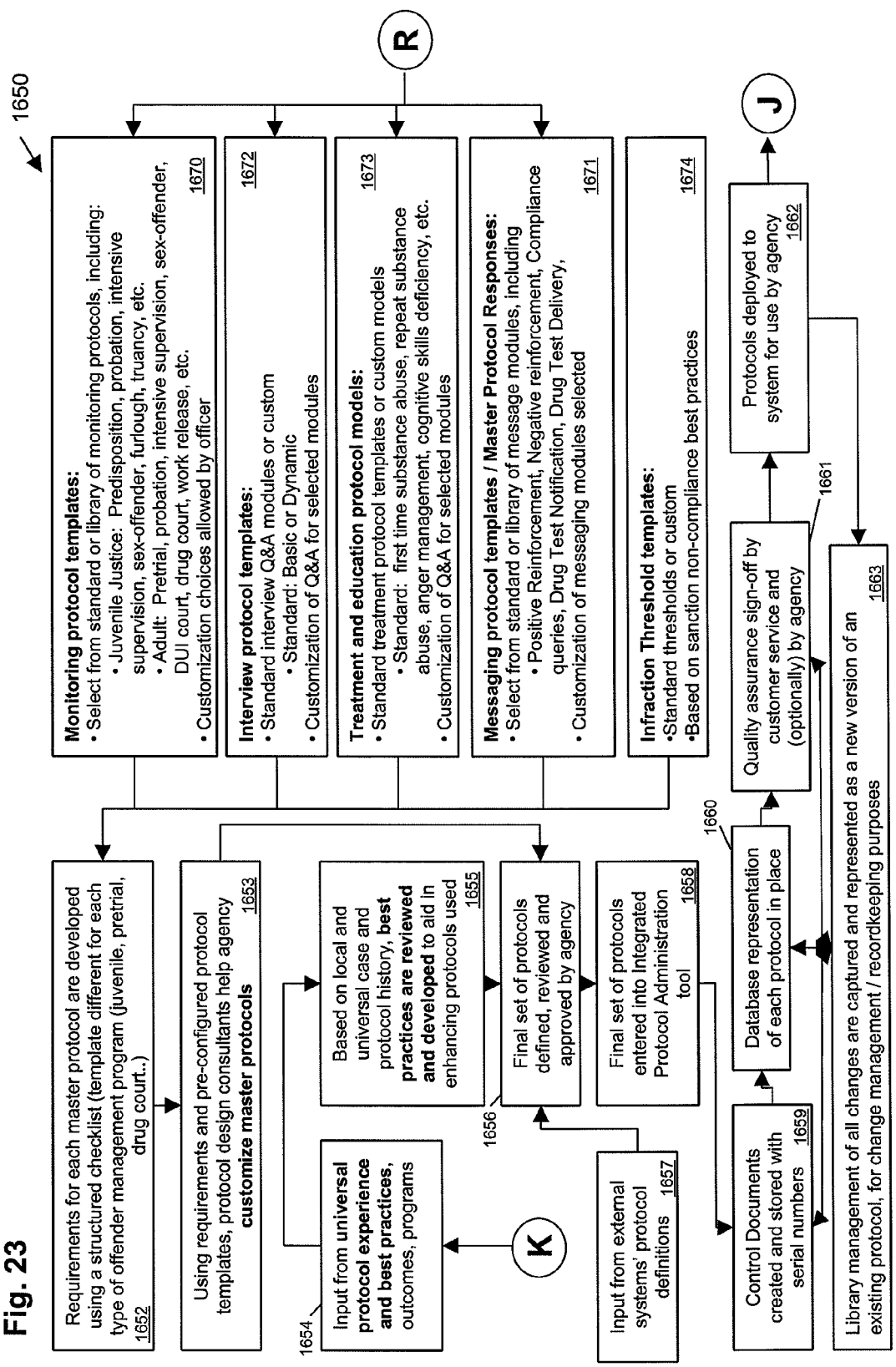
FIG. 23 is a flow diagram illustrating an exemplary protocol customization method in an embodiment of the present invention.

Further referencing FIGS. 22 and 23, and continuing to reference FIG. 9, a program within an agency, such as Intensive Supervision or Truancy, has a collection of protocols each designed to address specific behavioral and/or public safety issues with a class of subjects, customizable by case at step 1607 to achieve the end goals of the program. A protocol can include one or more supervision conditions at steps 1670, 1671 and 1672 and treatment elements at step 1673, such as monitoring via voice monitoring, RF monitoring, or GPS monitoring, alcohol-sensing monitoring and tests, random drug testing, education, therapy, counseling, regular officer meetings, community service, and short and long term incarceration.

Following the process in one embodiment, shown in FIGS. 9 and 23, the supervision components and treatment elements for each protocol are defined 303. In addition, the protocol compliance and messaging thresholds for each protocol are set based on agency standards and best practices for applying penalties for non-compliant behavior for each class of subject. An example of a protocol 1401 is shown in FIG. 20. This is not an example of every element that could be included in a customized protocol as it will be appreciated that different supervision components and treatment elements are available for inclusion in any given protocol.

Further referencing FIGS. 21, 23, 27 and 28, and continuing reference to FIGS. 8 and 9, in one embodiment of the invention, when protocol customization is complete for one or more protocols, a control document is created and reviewed by the agency for quality assurance purposes. Master protocol templates contain default settings at steps 2202, 2203 and 2204 to simplify the choices during this process, and are available through the protocol administration library management system at step 1663. Using the master protocols at steps 2207, 1671, 1672, 1673 and 1674 as a guide, each protocol is entered into the protocol administration application 1501 (FIG. 21) and affiliated with a particular agency through the Protocol Administration module 306 as shown in step 1658, 1659 and 1660. This information is written into the data store 209 for access as needed by the application. The Home page of protocol administration module 1501 is shown in FIG. 21. Protocol entry begins with pointing and clicking on a drop down list of Districts, selecting the District to associate the protocol with and then selecting the applicable agency(ies) within that District. The application then allows the selection of the number of steps contained within the protocol, from the most intense supervision step to the least intense supervision step. Typically, there are no more than eight steps within a protocol, with one step defined as Graduation and one step defined as Failure. Typically, three risk levels are chosen for inclusion in the protocol—high, medium and low. Selecting these three will give the user the option of assigning a High Risk level, Medium Risk level or Low Risk level to the subject during case setup 202. The threshold for protocol compliance and messaging triggers and response timings are entered for each risk level selected. These values make up the Infraction Thresholds used during the Automated Sanction/Response Handling process 205. Each step of the protocol can be configured with various elements including, but not limited to, step duration, monitoring hours, number of random calls, boundary calls (check-ins scheduled at the start or stop time of monitoring hours), preset calls (check-ins completed without a notification call being generated—typically used for check-ins from school or work), number of days per month calls are generated, monitoring blackout times (a period when no calls are generated—typically for uninterrupted sleep or work or school activities), treatment/education requirements and schedule, community service requirements and schedule, interview module and messaging modules such as positive reinforcement, negative reinforcement or meeting reminders 303 as illustrated at steps 2202, 2203, 2204 and 2003. The protocol administration application 306 directs the entry of the information required to create a protocol. If there are multiple protocols, each one must be entered separately. Each protocol generated is placed in the data store 209 and universal attributes are assigned to it so that best practices outcomes can be aggregated and analyzed for the benefit of all participating agencies. It is possible to retrieve existing protocols from the data store 209 for purposes of "cloning" the protocol. These stored protocols can also be used for analysis and reporting to discern success rates and to aid in continually refining best practices. The protocol administration module has three quality assurance checkpoints in step 1661 enforcing validation of data and comparison by multiple support personnel between the control document and the protocols created in the application 306. Once these three quality assurance checkpoints are completed, all the protocols with the associated supervision components and treatment elements created for an agency are activated in step 1662 for use through the Case Configuration 202 and/or Protocol Transition 207.

One embodiment of the invention processes data 1601 as shown in FIG. 22, as well in more detailed illustrations of substeps as found in FIGS. 23-28. FIG. 22 illustrates how the invention manages all aspects of creating a case at step 1602 and managing agency specific protocols at step 1650, selecting and personalizing case management characteristics at step 1603 and at step 1607, compliance, authentication and communications with the offenders at step 1608, measuring and storing all outcomes at step 1609, comparing outcomes to protocol thresholds at step 1701 and alerting appropriate officers and officials at step 1801, providing externally measured case outcomes (such as officer visits and treatment session outcomes) through external systems at step 1612, supporting officer decisions in reviewing of an integrated view of case status at step 1901, enabling officers to make complex adjustments with simple case configuration changes at step 2001, and enabling agencies to assess and improve their operational protocols with input from their own experience at step 1650 as well as universal experience from all other agencies at step 1613 who use this method.

One embodiment of the invention processes information defining agency protocols according to FIG. 23. Requirements definition at step 1652 for a master protocol, which can contain one or more supervision conditions and treatment components, are gathered using input from monitoring protocol templates at step 1670, interview protocol templates at step 1672, treatment and education protocol models at step 1673, and messaging protocol templates and master protocol message responses at step 1671. Additional input at steps 1654 and 1655 is available from local agency experience with these master protocols (if any) and from universal protocol experience aggregated from other agencies using similar or related master protocols. Using these inputs as guides, master protocols are defined at step 1653 with the assistance of protocol design consultants. If an external system has predefined protocols or supervision conditions and treatment at step 1657 that adhere to the protocol design of the invention, these can be incorporated into the set of master protocols for the local agency. Since master protocols can be modified upon use, experience and measured outcomes, agencies typically establish their initial master protocols fairly quickly at step 1656. Upon local agency approval of one or more master protocols, they are submitted into the application at step 1658 via the integrated protocol administration tool 306. Within the integrated protocol administration tool are a number of methods and steps designed to provide overall library management at step 1663, control and audit function at step 1659, quality assurance at step 1661 and record keeping of which protocols at step 1662, and related versions, are or were deployed. All representations of each master protocol, and all of its associated components, are stored in the data store 209. For purposes of recording outcomes in a way that contributes to the development of universal best practices at step 1613 that assist local agencies in their own master protocol design at step 1650, each master protocol is represented at step 1660 in the data store with classifications according to its supervision and treatment components, its associated characteristics, and associated measured outcomes. The final step of protocol customization is to deploy at step 1662 one or more master protocols to the application for use by the local agency.

With further reference to FIG. 22, and continuing reference to FIG. 23, in one embodiment of the invention, the totality of each agency's outcome data at steps 1901 and 2001 is aggregated in an organized way at step 1613 that allows for optimal best practice development at step 1650 for the criminal justice field. For each protocol that is deployed at step 1662, standard (universal) classifications are assigned at step 1660, including program type (Intensive Supervision, Adult DUI Court, Juvenile Predisposition, Long Term Drug Court, etc.), age and sex of the subject, risk factors, criminal offense, rating of subject repeat criminality likelihood, and treatment alternatives used (such as cognitive skills development, job skills development, intensive counseling, group therapy, etc.). Each case configuration at steps 1607 and 1608 is associated with a protocol, and each case is classified by the agency as successful or failed according to the goals defined in the protocol. In this way, through the use of standardized and normalized protocols across a plurality of agencies at step 1613, each constituent of the outcome data will find new and useful ways to benefit from the aggregated protocol outcome database at step 1655. For an individual agency, comparing their own outcomes against "national averages" will assist them in refining and improving their protocol design and deployment. For groups of agencies (in a state or as members of an interest group such as an industry association or a special task force), collecting, analyzing and preparing recommended standard policies and protocols will be made possible with fact-based research and best practices data that is otherwise impossible to acquire. For foundations and other grant-giving organizations, having access to a database of measured outcomes and documented best practices, their ability to better direct their grant funding to proven methods and protocols will improve the efficiency and impact of the funds distributed.

Further referencing FIGS. 5 and 24, in one embodiment of the invention processes information relating to the determination and handling of sanctions and/or responses at step 1701 for a subject being managed via a protocol. With inputs from at least three sources, activated protocols at step 1662, protocol-level outcomes at step 1901, and transaction level outcomes at steps 1609 and 1611, the sanction/response handler at step 1701 measures and compares actual subject behavior and compliance with protocol-defined thresholds at step 1702. For a failure-to-comply example, if a subject failed at step 1704 an alcohol-sensing test on Monday, the sanction/response handler could determine that an automated monitoring supervision component needed to be added at step 1704 as of Tuesday night. Further, this change in conditions on the subject could be determined at step 1704 and communicated 116 to the subject automatically notifying them that "Beginning Tuesday evening at 7 pm, you must be home between the hours of 7 pm and 7 am on a home detention program," and the sanction/response handler could automatically activate at step 1706 the voice monitoring system and notify the officer at step 1803 via their preferred method of communications at step 1806. As a compliance example, if a subject has complied with his initial 30-day treatment program and has had no violations on his curfew monitoring condition, the sanction/response handler could determine this at step 1703, select at step 1706 and dynamically build 116 a positive reinforcement message to send to the subject 108 and notify the subject that their officer has been sent a recommendation at step 1803 via their preferred method of communications at step 1803 for more lenient monitoring conditions. For an example for the handling of exceptions not associated with immediate action required, if a subject responds to an interview question regarding their status of employment as being "no longer employed", the sanction/response handler could determine at step 1705 that this condition requires attention by requesting an officer meeting within one week, and could further select at step 1706 and send a message 108 to the subject telling him that he needs to contact his officer within 24 hours to set a meeting. In the event that it is determined that no meeting was scheduled with the officer at step 1704, the system could then create a required attention item at step 1706 for the officer via a transition recommendation notification at step 1802 via their preferred method of communication at step 1806. In the event that a response requires supervisor involvement at step 1707, or an officer has failed to act in a timely manner, the supervisor will be provided pertinent information via an exception management report at step 1805 and/or a case specific alert at step 1804. The embodiment of the invention provides the capability to concurrently measure and compare multiple dimensions of compliance and non-compliance of a single subject, run business rules according to protocols to determine the next course of action, make automatic changes or authorized requests for changes to supervision conditions and treatment, dynamically create case and condition specific messages using positive or negative reinforcement designed to set and manage expectations with subjects, and alert officers and supervisors of changes or when their intervention or approval of pending action is required.

One embodiment of the invention processes information relating to the alerting and reporting of sanction or response actions or recommendations is shown in FIG. 25. After business rules have triggered decisions, actions or recommendations, at steps 1703, 1704, 1705, 1706 or 1707, a combination of factors are used to determine how the information is provided to the recipient. These factors are defined and associated with officers and supervisors at step 1806 as well as with protocols at step 1650 and cases at step 1607. The factors include criticality of information (does it need to be acted upon immediately or within 24 hours), the requirement for the assigned officer to communicate to a subject regarding actions taken or pending, the nature of the information being summary exception information or immediate attention required, or both, and the preferred communications method for each of the recipients. For example, if a subject failed to check-in via voice monitoring an excessive number of times at step 1608, and the sanction/response handler at step 1701 determined from the protocol at step 1662 the next step was to recommend a step-up in voice monitoring that included 24-hour monitoring for the next four weekends (weekend house arrest), this item would require officer intervention at step 1802 to approve the step-up and to communicate, via application provide client instructions 801, its impact and understanding to the subject. This information package would be sent via email at step 1807, as a single case transition recommendation, containing a web link to the protocol transition page on the application, as well as a brief description of the cause for the recommendation. The same information is made immediately available on the case summary page 701 for the case, and the status of the case on the program summary 601 is changed from OK to Attention, with a link 602 to the protocol transition page 1301 to simplify immediate action on the part of the officer.

One embodiment of the invention processes information relating to how an officer performs a case review in response to a number of typical case investigation situations, as shown in FIG. 26. While very fine granularity is available via the application to all and any historical data, automated or officer decisions, supervision conditions and/or treatment components and associated outcomes, case management is enhanced and enabled through the combination at step 1902 of the activated protocols, case characteristics such as risk and history, the history of measured outcomes, and situation specific event(s). Additionally, the application can associate relevant external information at step 1903 about a case to support officer decision making. As shown on the dashboard 501 and the program summary page 601, bringing officer visibility directly to those items needing immediate attention, and to those items requiring awareness is essential for ease of operation in an environment where officer caseloads range from 40 to 250 cases at a time. If during the process of case investigation, updates to the case file are required at step 1904 to explain certain conditions or subject non-compliance, the officer can make such notes, and "excuse" such attention items or can heighten the level of attention needed (for example, a supervisor review) by noting additional risk factors. Further research is available at step 1906 to the officer investigation regarding a potential course of action by searching on a local and/or universal data store of protocol history, outcome history, and on problem-resolution samples derived from aggregate best practices information. Upon arriving at the point where an officer is prepared to make an informed case management decision at step 1905 regarding an increase or decrease in supervision conditions and/or treatment components, reason codes and officers explanations can be captured and stored in the data store for future analysis.

One embodiment of the invention processes information relating to how protocol transitions are completed, as shown in FIG. 27. During analysis of the case review information at step 1901, the application provided pertinent case and protocol information for the officer to act upon. When an officer is reviewing a protocol transition recommendation at step 2002 and screen 1301 (whether due to a supervision or treatment related protocol step or due to an interview/messaging exception requiring attention), the specified recommendation is described in detail 1301, including the client instructions 801 that would be available to be given to the subject in the event of a change of supervision and treatment conditions. If needed, a protocol specified recommendation can be augmented with a case-specific supervision or treatment condition change at step 2003. Such changes are made by the officer on the respective case info screens 410, 411, and 412 or more simply by making a plain-English request via the schedule change request 1201. On screen 410, an officer can make general changes such as monitoring start/end times, assigned officer, and alert mechanism. From the Case Info screen 410, the curfew schedule screen 411 allows the recurring weekly monitoring schedule to be modified, the activity schedule screen 412 allows the supervision and treatment schedule to modified due to a single event or a recurring event, the schedule graph screen 413 shows a graphical display of the subject schedule, and the case history screen 421 shows outcomes of the subject behavior. Any features that were or are available for inclusion in a master protocol are available for a case specific supervision or treatment condition at step 2003. Upon successful completion of or failure from a supervision condition or treatment component, the officer codes the outcome and includes an explanation for recordkeeping and future analysis on screen 1301. If the protocol for the case has more than one condition or component, the officer will decide to continue or finish a concurrent condition or component (such as counseling), or start a new component (such as GPS monitoring might follow subject failure of high intensity voice monitoring). For any decisions that an officer makes where supervision conditions or treatment components have changed, the application stores that decision in the data store 209 and invokes application processing at step 2005 to make the changes take effect on the effective date chosen by the officer. For example, if a subject had successfully completed the first stage of voice monitoring at step 1608 and at step 1609, whereby the sanction/response handler at step 1701 had suggested that the subject be rewarded with a later curfew start time, and the officer had approved that change at step 2001, the application processing logic would then change the case monitoring characteristics at step 2005 to reflect the later curfew start time, and an updated set of client instructions 801 would be available for the officer to convey to the subject and/or a message would be dynamically defined 116 and prepared for delivery upon the next subject check-in at step 1608. If for the same example, there was also a next stage group therapy session every Tuesday night for six weeks, the application processing logic would send an electronic request to the registrar/scheduler at step 1604 for that subject to be enrolled in a class, and an updated set of client instructions 801 would be available for the officer to convey both the monitoring schedule change and the attendance at the Tuesday night group therapy session (address and phone number included in the instructions) and/or a message would be dynamically defined 116 to this effect and prepared for delivery upon the next subject check-in at step 1608. If an assigned protocol no longer applies to the needs of a case or the case has changed programs within an agency (from pre-trial to probation for example), an officer may choose to change protocol at step 2006 affiliated with any particular case.

Figure 28:
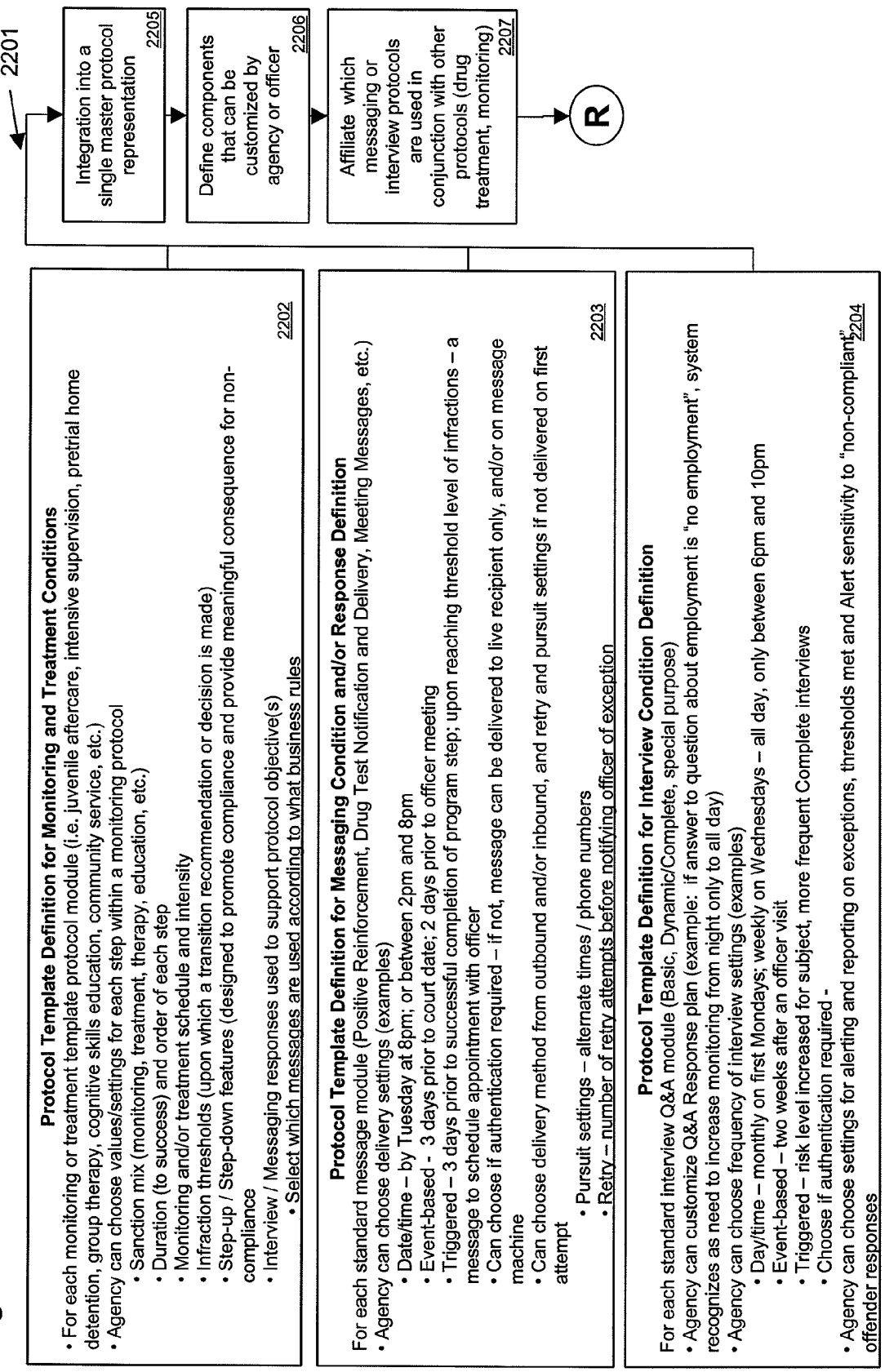
FIG. 28 is a flow diagram illustrating an exemplary protocol template customization method in an embodiment of the present invention.

As shown in FIG. 28, one embodiment of the invention processes information relating to how protocol templates are developed and defined at step 2201 for any and all agencies to use as a foundation for the personalized integrated framework of protocol-based supervision conditions and treatment components. One or more template building checklists at steps 2203, 2204, and other future template creation models are available for protocol template development. For the Monitoring and Treatment template protocols at step 2202, workable components and features of the template protocol include the selection and definition of the sanction mix (monitoring, treatment, therapy, drug testing, alcohol testing, education, office visits, home visits), the duration defaults to success of each step, the schedule and intensity defaults of each component, the violation threshold defaults (upon which automated message responses are triggered and/or transitions recommendations are made), step-down features designed to reward compliance in a meaningful and timely way, step-up features designed to provide meaningful and timely consequences for non-compliance, and message responses to compliance (positive reinforcement messages) and non-compliance (negative reinforcement) and their associated delivery settings default. For the Messaging Condition/Response template protocols at step 2203, workable components and features of the template protocol include message delivery triggers (date/time, event based, triggered by measured outcomes individually, in aggregate and/or relative to overall case compliance rating), whether any particular message requires voice authentication for its delivery and if not whether the particular message be delivered to an unattended voicemail, and delivery method default settings for outbound/inbound processing, pursuit default settings (for pursuing delivery of message via a secondary or tertiary phone number), and retry default settings (the number of retry attempts before notifying officer of deliver exception). For the interview condition template protocol at step 2204, workable components and features are selected from among three basic models—basic, dynamic/complete and special purpose. The basic model allows for address and phone number verification and employment verification. The dynamic/complete model allows for the selection from among a wide variety of probation interview questions and answers—including those available in the basic model plus questions and drill downs (follow-on questions depending on subject answers) related to drug or alcohol use, contact with law enforcement, attendance at court ordered treatment programs, substance abuse, any form of violent acts, any criminal act, and other related questions. The special purpose model allows an agency to custom design interactive question and answer dialogs for use inside the protocol-managed system. For any single master protocol, a combination of protocol template elements are integrated into a single representation at step 2205. For any single master protocol, a definition is made at step 2206 regarding which elements of the template protocol elements can be customized by the agency and/or officer, and which elements are interconnected (for example, continuous alcohol monitoring with voice monitoring for a high risk DUI offender). For any single master protocol, specific message responses and/or interview dialogs are affiliated at step 2207 as messaging or interview modules for personalization by a local agency.

The graduated sanction and progressive response system and methods allow criminal justice agencies to enhance the efficiency and quality of their operations. The method includes a unique framework of one or more integrated protocols, which guides and assists the process by which criminal justice professionals carry out their supervision and treatment responsibilities for the offender caseload. By integrating supervision conditions and treatment alternatives into manageable and measurable protocols, using components such as voice monitoring, RF monitoring, GPS monitoring, continuous alcohol monitoring, drug testing, counseling, therapy, drug and alcohol treatment, cognitive skills development, education, and officer visits and contacts, agencies can improve the timeliness and responsiveness of their staff to unique needs across large caseloads as well as measure and compare outcomes in a consistent fashion. By incorporating predefined protocol steps and communications and messaging components able to respond immediately to a subject's compliance or non-compliance, the officer's impact on each case is significantly enhanced without requiring their personal involvement or analysis for every minor step or event. The invention allows agencies to adhere to their jurisdiction's respective laws and regulations, while implementing agency specific best practices based on a combination of universal outcomes and experiences and their own outcomes and experiences. The benefits include standardization of a family of protocols for each classification of offender; standardization of sanctions and responses by officers thereby saving time and increasing responsiveness to case compliance issues; standardization of management methods by an agency whereby management reports and decision making is enabled from a common foundation and framework of information; implementation of a system of expectations regarding failure to comply followed by timely communications and follow-up on consequences or supervision changes for non-compliance; implementation of a system of offender expectations for compliance followed by timely positive reinforcement and the delivery of promised incentives; providing an important and valuable structure around an offender's case plan that enables them to achieve success one step at a time without burdening an officer with time consuming management of detailed events; automation of the initiation and execution of an integrated and complex set of case management characteristics; automation of the compliance, authentication and communicating with each offender according to the stage of their respective protocol; automated recordkeeping of all compliance, exception, communications to and from the offender, and protocol step decisions; automation of customizable business rules to determine the success or failure of a protocol stage for cases with varying levels of risk and requirements; automated definition of recommendations for next step actions to progress a subject to more supervision or less based on their record of compliance; automation of alerts and reports that are sent according to varying levels of attention required such as immediate attention, attention soon, or general exceptions; automation of protocol transition responses based on business rules that allow for step-ups or step-downs to be completed without officer intervention; automation of protocol transition responses that are prepared for review by officers so that with a simple set of choices, multiple dimensions of supervision and/or treatment can be modified without further officer intervention; automation of best practice data collection, analysis and reporting on protocol outcomes based on varying dimensions of classifications such as monitoring only, monitoring and treatment, monitoring, treatment and counseling, treatment only, and so on; automation of the definition, personalization, and management of each integrated protocol so that it is easy to deploy and modify over time; secured access to role-based view of case information across local jurisdictions, regions and districts; a single database that houses all representations of protocols, their associated histories and case outcomes, all case histories and related case management notes and decisions, and all monitoring and messaging audio files; parameter driven features that determine how business rules are triggered for agency customization, protocol customization, monitoring and messaging customization, officer profile management, and alerts and reports customization; data management, systems operations and disaster recovery management to ensure availability of the resources of the system to the users of the system; protocol design consultation, planning and training services to streamline the implementation of and maximize the benefits of the system; and ongoing account management, client service and end-user support. Accordingly, in such embodiments, a configuration of rules (more generally than the "case configuration" in the government context) is established for monitoring and detecting behavior of an individual under the care of a caretaker.

Although the invention herein has been described in the context of the criminal justice field, embodiments of the invention exist in other fields such as: 1) elder care monitoring and messaging by their family or guardians; 2) "latch key children" monitoring (at home on time from school, and staying home) and conditional messaging (homework on Tuesday, test reminder on Thursday) by parents and guardians; and 3) monitoring safety and well-being of children or young adults traveling or working away from childhood home by their parents or guardians.

Although the invention herein has been described with reference to particular embodiments, it is to be understood that these embodiments are merely illustrative of the principals and applications of the present invention. Accordingly, while the invention has been described with reference to the structures and processes disclosed, it is not confined to the details set forth, but is intended to cover such modifications or changes as may fall within the scope of the following claims.

What is claimed is:

1. A computer-implemented method for managing behavior of an individual comprising the steps of:
   establishing a configuration of rules on a computer network that includes a multi-step protocol for behavior of at least one individual;
   associating a contact for notification of a detected behavior of the at least one individual meeting a predefined threshold of the protocol;
   providing a computerized message to the at least one individual initiated from the computer network according to the protocol;
   detecting behavior of the at least one individual based on an action or a lack of an action from the at least one individual;
   recommending modification of the configuration of rules to the contact based on automatically detecting the behavior of the at least one individual; and
   automatically notifying the contact when the predefined threshold of the protocol is met.

2. The method according to claim 1, wherein the contact is a government contact and the configuration of rules is a case configuration.

3. The method according to claim 2 further comprising:
   managing a protocol condition selected from the group consisting of a supervision condition and a treatment alternative;

and administering the protocol condition via the computer network.

4. The method according to claim 2 further comprising modifying the case configuration based on automatically detecting the behavior of the at least one individual.

5. The method according to claim 2 further comprising automatically recommending modification of the case configuration to the government contact based on automatically detecting the behavior of the at least one individual.

6. The method according to claim 2 further comprising automatically tracking results of behavior of a plurality of individuals and generating one or more reports based on one or more classification categories assigned to individuals and their associated protocols.

7. The method according to claim 2 further comprising monitoring results of modification of the case configuration according to a transition recommendation.

8. The method according to claim 1 further comprising verifying identity of the at least one individual using biometrics.

9. The method according to claim 8 further comprising establishing physical location of the at least one individual during the computerized message.

10. The method according to claim 8 further comprising delivering random drug test notifications and drug test results upon a successful biometric check-in.

11. The method according to claim 8 further comprising delivering payment status and reminders upon a successful biometric check-in.

12. The method according to claim 8 further comprising providing an interactive dialog interview upon a successful biometric check-in.

13. The method according to claim 1 further comprising randomizing the computerized messages to the at least one individual.

14. The method according to claim 1 wherein the computerized message is selected from the group consisting of positive reinforcement, negative reinforcement and appointment reminder.

15. The method according to claim 1 further comprising verifying identity of the at least one individual using voice biometrics.

16. A computer-implemented method for managing behavior of an individual comprising the steps of:

establishing a configuration of rules on a computer network that includes a protocol for behavior of at least one individual;

associating a contact for notification of a detected behavior of the at least one individual meeting a predefined threshold of the protocol;

providing a computerized message to the at least one individual initiated from the computer network according to the protocol;

detecting behavior of the at least one individual based on a response or a lack of a response from the at least one individual; and automatically providing computerized message feedback to the individual in response to detecting behavior of the at least one individual.

17. The method according to claim 16 further comprising initiating a random schedule of computerized messages to the at least one individual and establishing physical location of the at least one individual during each computerized message.

18. The method according to claim 16 wherein the contact is a caretaker and the at least one individual is under the care of the caretaker.

19. The method according to claim 16 further comprising verifying identity of the at least one individual using voice biometrics.

20. The method according to claim 16 further comprising automatically tracking results of behavior of a plurality of individuals and generating one or more reports based on one or more classification categories assigned to individuals and their associated protocols.

\* \* \* \* \*